United States Patent
Kerr

(10) Patent No.: US 9,732,803 B2
(45) Date of Patent: Aug. 15, 2017

(54) CONCENTRIC V-GROOVE COUPLING

(71) Applicant: Ker-Train Holdings Ltd., Kingston (CA)

(72) Inventor: John Hugh Kerr, Kingston (CA)

(73) Assignee: Ker-Train Holdings Ltd., Kingston (CA)

( * ) Notice: Subject to any disclaimer, the term of this patent is extended or adjusted under 35 U.S.C. 154(b) by 59 days.

(21) Appl. No.: 14/319,049

(22) Filed: Jun. 30, 2014

(65) Prior Publication Data

US 2015/0053525 A1 Feb. 26, 2015

Related U.S. Application Data

(63) Continuation of application No. 12/992,462, filed as application No. PCT/CA2009/000667 on May 15, 2009, now Pat. No. 8,764,597.

(60) Provisional application No. 61/053,275, filed on May 15, 2008.

(51) Int. Cl.
| | |
|---|---|
| *F16D 11/00* | (2006.01) |
| *F16D 25/0632* | (2006.01) |
| *F16D 25/10* | (2006.01) |
| *F16D 25/061* | (2006.01) |

(52) U.S. Cl.
CPC ............ *F16D 11/00* (2013.01); *F16D 25/061* (2013.01); *F16D 25/0632* (2013.01); *F16D 25/10* (2013.01); *Y10T 74/1558* (2015.01)

(58) Field of Classification Search
CPC ....... F16D 25/064; F16D 25/061; F16D 11/00
See application file for complete search history.

(56) References Cited

U.S. PATENT DOCUMENTS

| | | | | |
|---|---|---|---|---|
| 2,597,502 | A * | 5/1952 | Lapsley | F16D 25/064 192/32 |
| 5,577,585 | A * | 11/1996 | Corral | F16D 25/085 192/110 B |
| 6,050,378 | A * | 4/2000 | Muramatsu | F16D 41/07 192/41 A |
| 6,126,566 | A * | 10/2000 | Kerr | B62M 11/04 475/173 |
| 6,669,594 | B2 * | 12/2003 | Kerr | B62M 11/04 475/173 |
| 2003/0109351 | A1 * | 6/2003 | Gradu | B60K 17/35 475/269 |

* cited by examiner

*Primary Examiner* — Derek D Knight
(74) *Attorney, Agent, or Firm* — Greenberg Traurig, LLP

(57) ABSTRACT

A coupling comprises a pair of clutch end members, a clutch center member disposed between the clutch end members, and an actuator coupled to one of the end members. Each end member includes concentric V-grooves disposed on a respective face thereof. The center member is axially movable between the end members, and includes a pair of opposing surfaces. One of the opposing surfaces includes concentric V-grooves configured to mesh with the V-grooves of one of the end members. Another of the opposing surfaces includes concentric V-grooves configured to mesh with the V-grooves of another of the end members. The actuator is configured to simultaneously couple the end members to the center member by urging the V-grooves of both of the end members into engagement with the V-grooves of the center member.

29 Claims, 13 Drawing Sheets

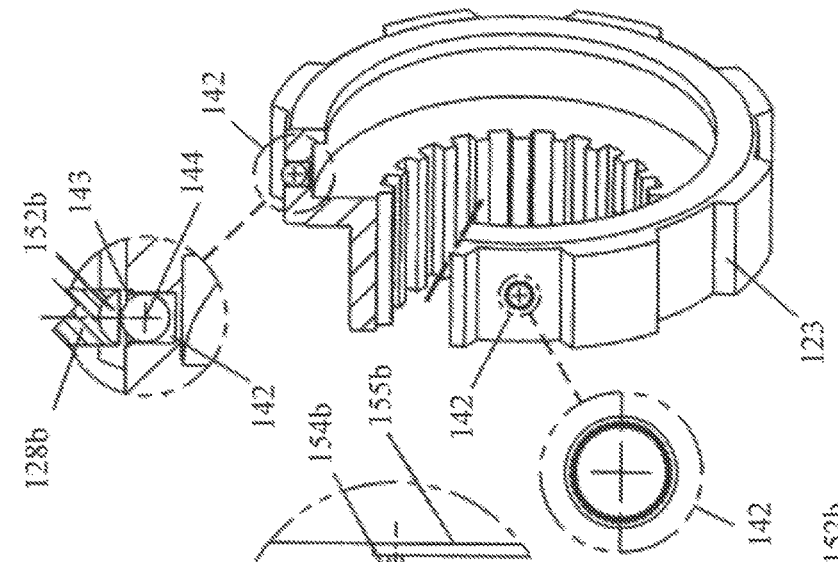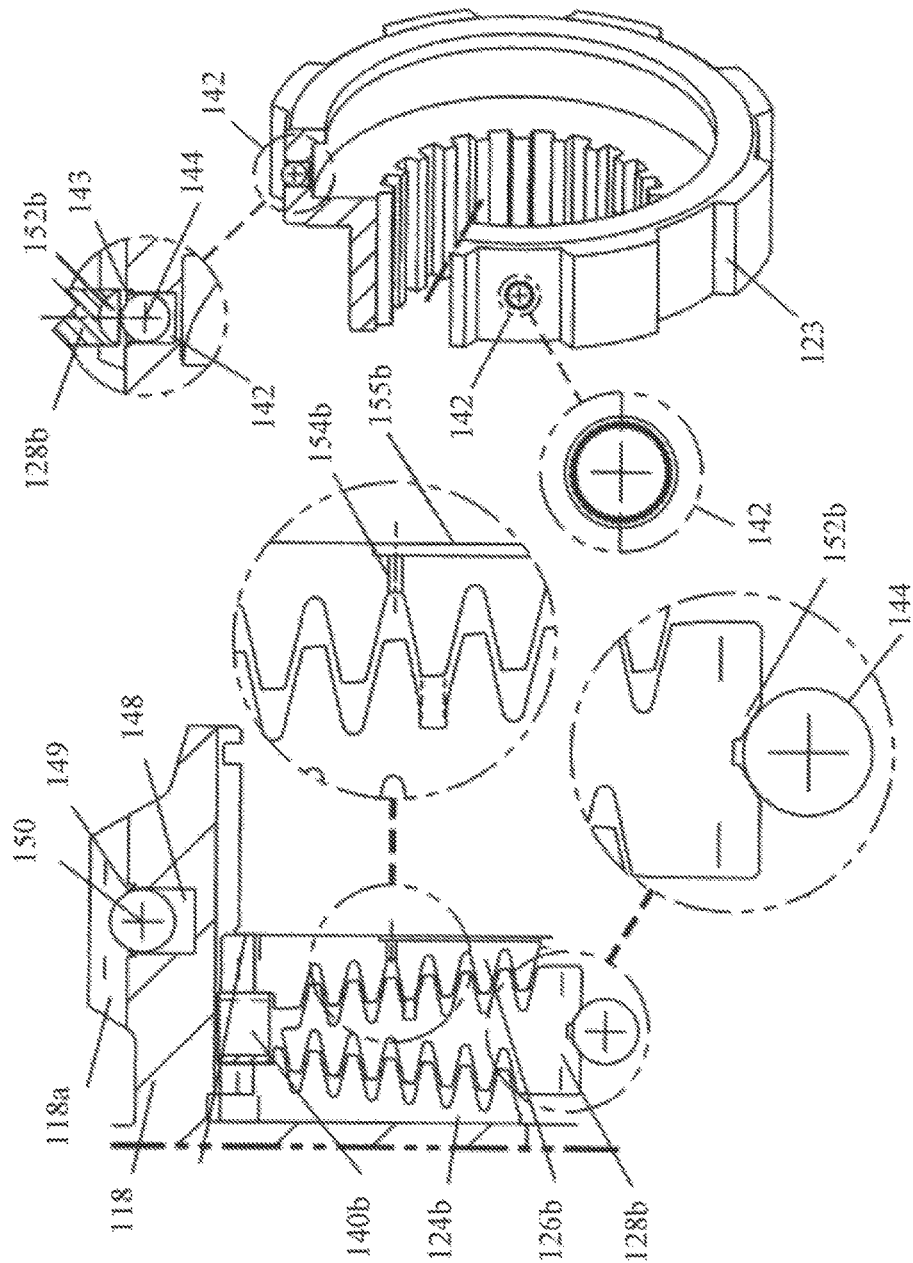

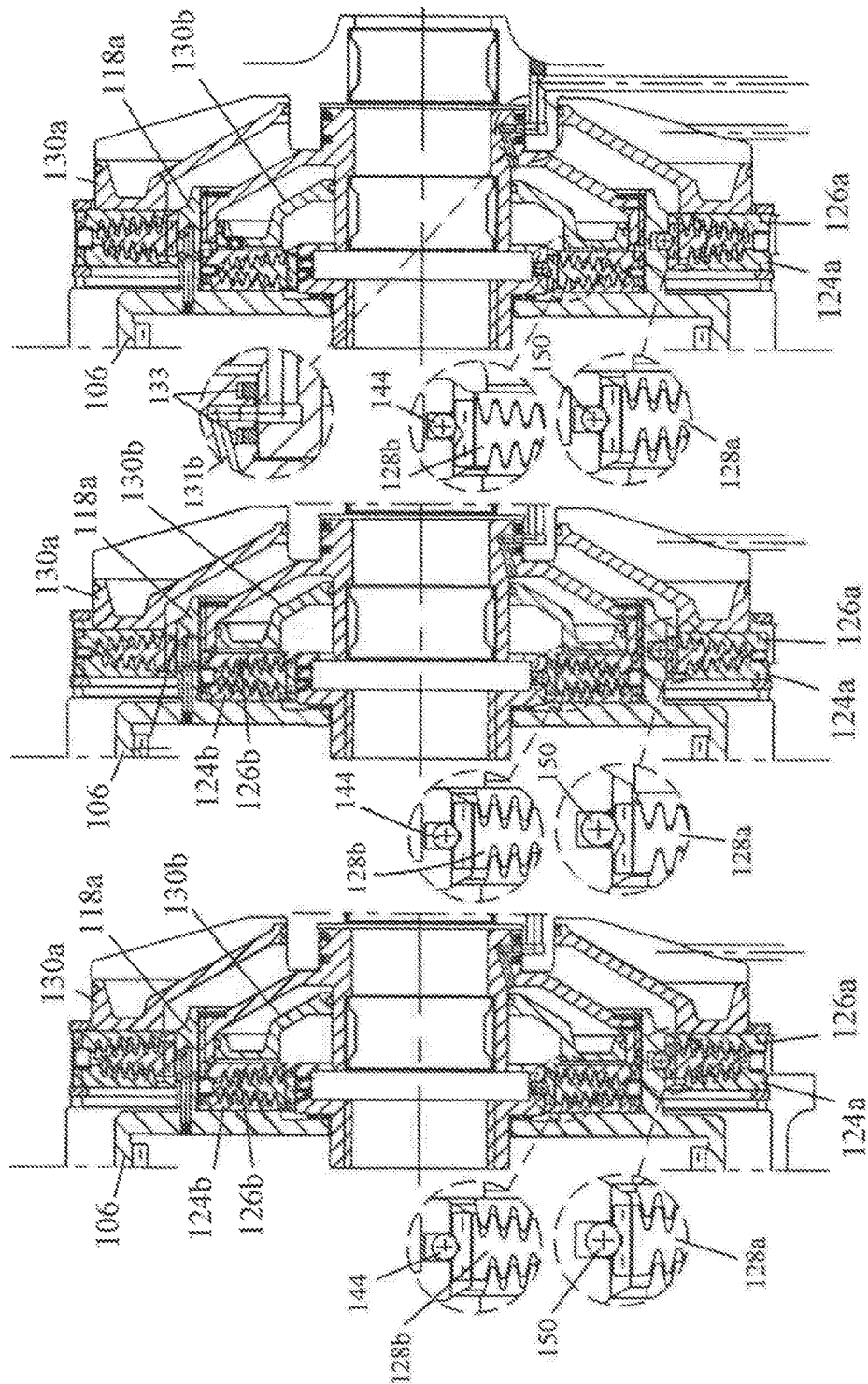

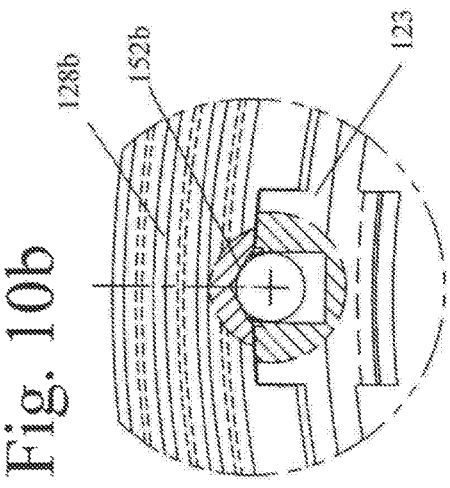
Fig. 10b
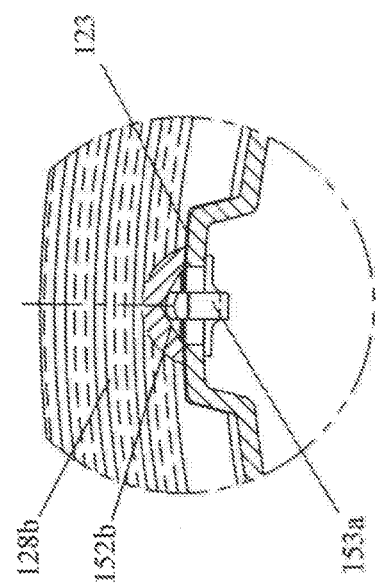
Fig. 11b
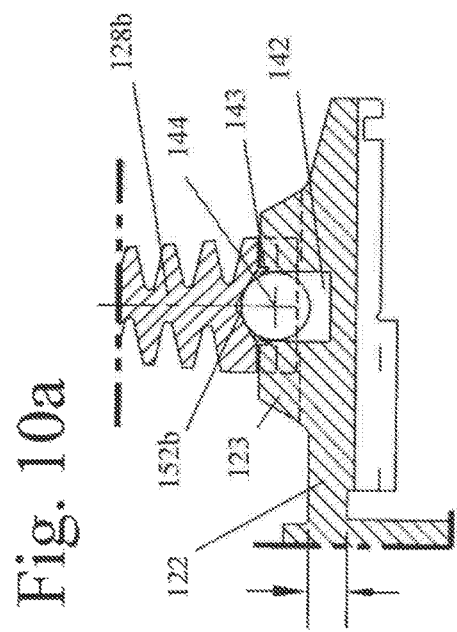
Fig. 10a
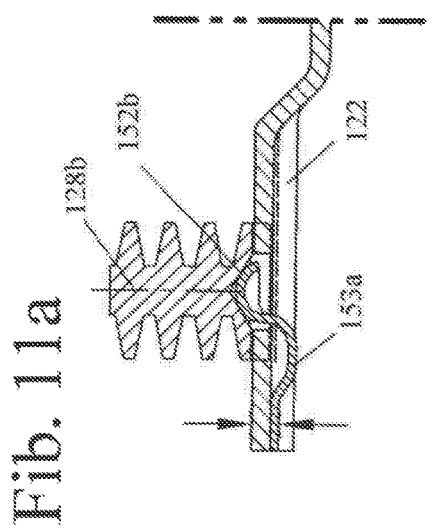
Fib. 11a

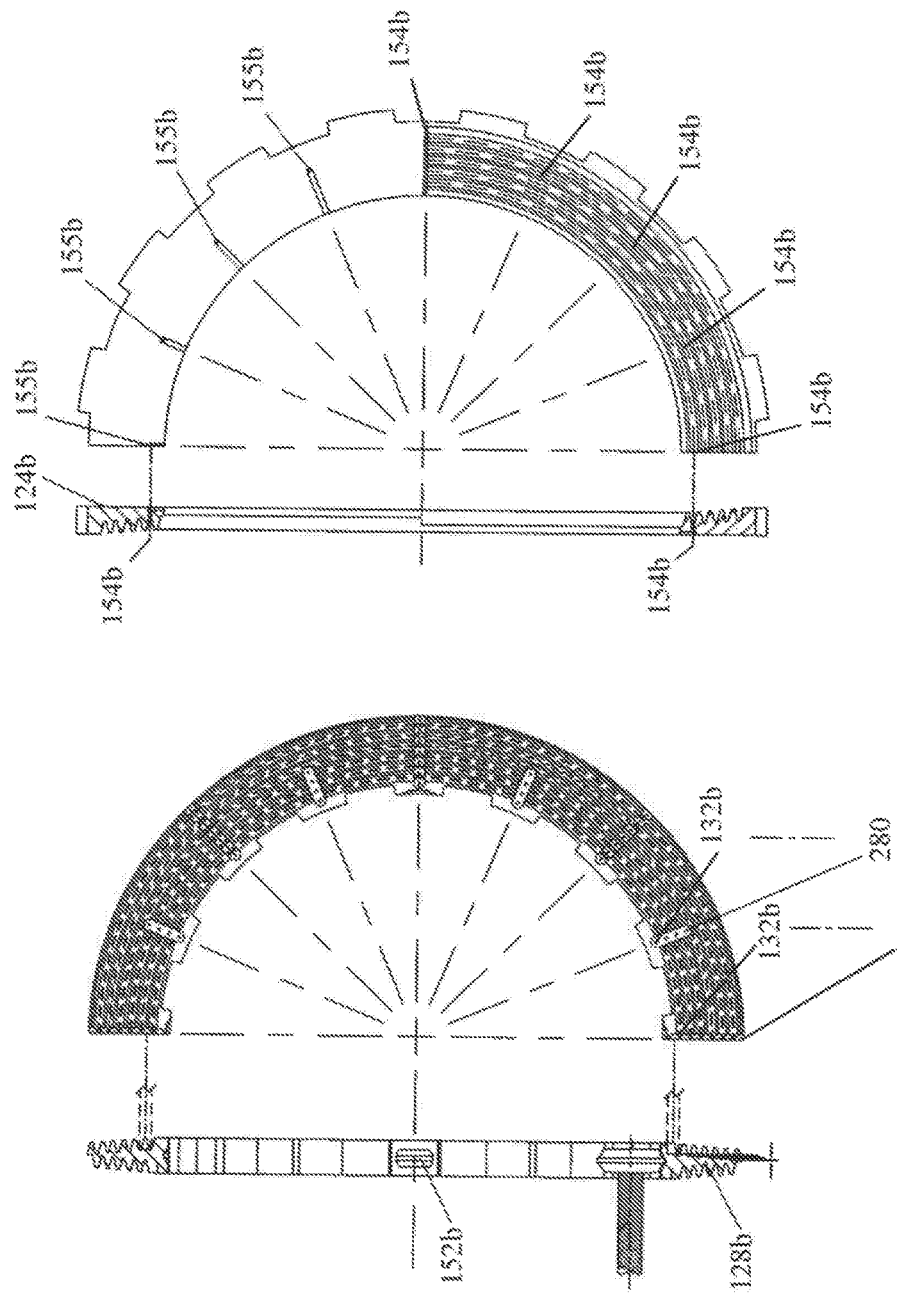

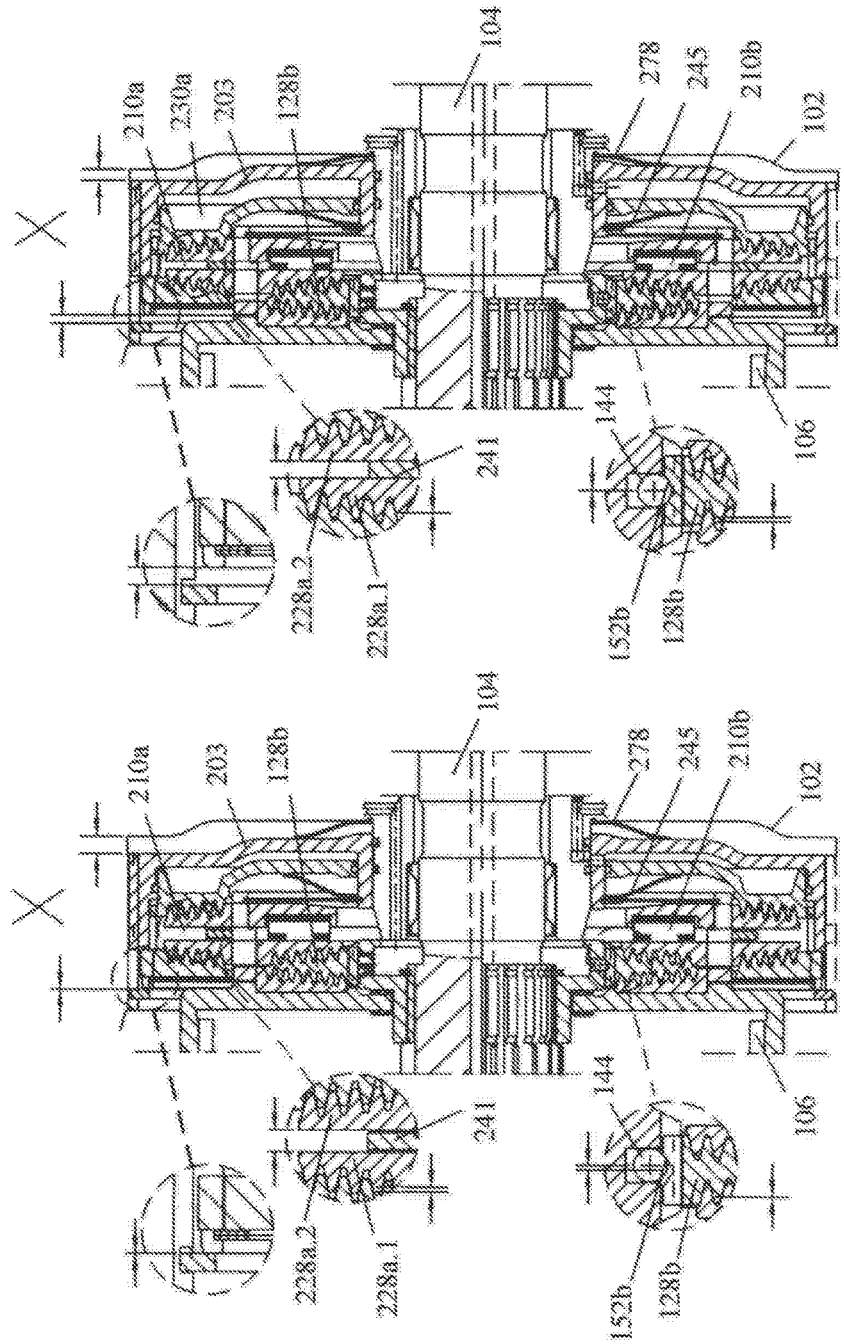

CONCENTRIC V-GROOVE COUPLING

RELATED APPLICATIONS

This patent application is a continuation of co-pending U.S. patent application Ser. No. 12/992,462, entitled "Concentric V-Groove Coupling," and filed Nov. 12, 2010, which is a §371 national application of PCT Application No. PCT/CA09/00667, entitled "Concentric V-Groove Coupling," and filed May 15, 2009, which claims the benefit of the filing date of U.S. Provisional Patent Application Ser. No. 61/053,275, entitled "Poly-Cone Coupling," filed May 15, 2008, the disclosures of each of which are incorporated herein by reference.

FIELD

This patent application relates to a coupling for transmitting torque between a torque input member and a torque output member.

BACKGROUND

Over the past 10 years, improvements have been made in the precision manufacture of automatic transmission components. However, the planetary gear-sets and multi-disc/plate couplings of conventional automotive transmissions have undergone little conceptual change since their first introduction in the 1930's.

No-load losses (built-in parasitic losses) in conventional automotive transmissions having three or more planetary gear sets vary between 15,000 and 20,000 watts. Since 70% of all vehicle use requires 20 to 25 hp for highway driving, a parasitic no-load loss of 20,000 watts (at 25 hp) indicates a transmission efficiency of only about 50%. Therefore, although some improvements have been made in automotive transmissions, there has been little improvement in the efficiency of vehicle drive-lines.

SUMMARY

In one aspect, this patent application describes a coupling for transferring torque between a torque input and a torque output. The coupling comprises a pair of clutch end members, a clutch centre member that is disposed between the clutch end members, and an actuator that is coupled to one of the end members. Each end member includes a set of concentric V-grooves disposed on a respective face thereof.

The centre member is axially movable between the end members, and includes a pair of opposing surfaces. One of the opposing surfaces includes a plurality of concentric V-grooves that are configured to mesh with the set of V-grooves of one of the end members. Another of the opposing surfaces includes a plurality of concentric V-grooves that are configured to mesh with the set of V-grooves of another of the end members. The actuator is configured to simultaneously couple the end members to the centre member by urging the V-grooves of both of the end members into engagement with the V-grooves of the centre member.

In another aspect, this patent application describes a transmission drive-line stage that incorporates the coupling. The transmission drive-line stage comprises a transmission housing, a torque input member, a torque reactive member, a torque output member, and the aforementioned coupling. The torque input, torque reactive member, torque output member and the coupling are all disposed within the transmission housing. The coupling is configured to transfer torque between the torque input member and the torque output member. The torque output member is coupled to the torque input member and the torque reactive member.

In one implementation of the coupling, the actuator is configured to simultaneously couple the end members to the centre member together by urging the face of the one end member against the one surface of the centre member until engagement of the other surface of the centre member with the face of the other end member.

The opposing surfaces of the centre member may be disposed at an acute angle relative to each other, such that the centre member is thinner at its outer end than at its inner end, and the face of each end member is parallel to the associated opposing surface of the centre member. Further, each V-groove comprises a root that is disposed between adjacent peaks, and the roots of the one opposing surface of the centre member may be radially offset from the roots of the other opposing surface.

The coupling may comprise a centering mechanism that is coupled to the centre member and is configured to urge the center member away from the end members upon deactivation of the actuator. The centering mechanism may comprise a ball bearing or a spring coupled to a rotational shaft. The radially inner end of the centre member may be configured for mounting to the rotational shaft, and may comprise a recess that is configured for capturing the centering mechanism therein. In one implementation, the recess comprises a V-shaped pocket.

Each V-groove that is provided on the centre member comprises a root that is disposed between adjacent peaks, and the centre member may comprise at least one oil passage that is configured to facilitate a cascading oil flow to the V-grooves of the end members. Each oil passage may extend radially through a plurality of the roots towards the inner end of the centre member. Preferably, the centre member comprises a plurality of the oil passages, each extending through a respective number of the roots in accordance with the angular position of the respective oil passage.

Each V-groove that is provided on the one end member comprises a root disposed between adjacent peaks, and the one end member may comprise at least one oil passage that is configured to provide a flow of oil to the associated V-grooves of the centre member. Each oil passage may comprise a through-hole that extends axially from one of the roots towards an opposite face of the one end member, and a slot that is provided in the opposite face and extends radially from the through-hole towards the inner end of the end member. Preferably, the one end member comprises a plurality of the oil passages, disposed at varying radial positions around the circumference of the one end member.

In one implementation of the coupling, the centre member comprises a pair of clutch plates, and a spring that is disposed between the clutch plates and urges the clutch plates axially apart. The clutch plates are configured for rotation in unison about a common axis of rotation. One of the clutch plates is axially movable with respect to another of the clutch plates. The one clutch plate comprises one of the opposing surfaces, and the other clutch plate comprises the other opposing surface.

In another aspect, this patent application describes a transmission drive-line stage that comprises a torque input member, a torque reactive member, a torque output member and a pair of torque couplings. The torque output member is coupled to the torque input member and the torque reactive member. The torque couplings are disposed within a transmission case and are configured to transfer torque between the torque input member and the torque output member.

Each torque coupling is configured to provide a respective gear ratio between the torque input member and the torque output member, and comprises a pair of clutch end members, a clutch centre member that is disposed between the respective clutch end members, and an actuator that is coupled to one of the respective end members. Each end member includes a set of concentric V-grooves disposed on a respective face thereof.

The centre member is axially movable between the respective end members, and includes a pair of opposing surfaces. One of the opposing surfaces includes a plurality of concentric V-grooves that are configured to mesh with the set of V-grooves of one of the respective end members. Another of the opposing surfaces includes a plurality of concentric V-grooves that are configured to mesh with the set of V-grooves of another of the respective end members. The actuator is configured to simultaneously couple the end members to the centre member by engagement of the V-grooves of both of the respective end members with the V-grooves of the centre member.

One of the end members of one of the torque couplings is coupled to the transmission case. The centre member of the one torque coupling is coupled to the torque reactive member. One of the end members of another of the torque couplings is coupled to the torque reactive member. The centre member of the other torque coupling is coupled to the torque input member.

The actuator of the one torque coupling may be operable independently of the actuator of the another torque coupling. Alternately, the actuator of the other torque coupling may be configured to uncouple the end members and the centre member thereof in synchronism with activation of the actuator of the one torque coupling, such that an increase in torque between the end members and the centre member in the one torque coupling is accompanied by a corresponding decrease in torque between the end members and the centre member in the another torque coupling.

The actuator of the one torque coupling may comprise a piston, and the actuator of the other torque coupling may comprise a biasing spring that urges the end members and the centre member thereof together. The piston and the biasing spring are configured to limit drive-line torque discontinuity during the transition between the gear ratios.

In one implementation of the transmission drive-line stage, the centre member of the one torque coupling comprises a pair of clutch plates, and the biasing spring is disposed between the clutch plates and urges the clutch plates axially apart. The clutch plates are configured for rotation in unison about a common axis of rotation. One of the clutch plates is axially movable with respect to another of the clutch plates. The one clutch plate comprises one of the opposing surfaces of the one torque coupling. The other clutch plate comprises the other of the opposing surfaces of the one torque coupling and also comprising one of the end members of the other torque coupling.

Each V-groove of the centre member of the one torque coupling comprises a root that is disposed between adjacent peaks, and the roots of the one clutch plate may be radially offset from the roots of the other clutch plate.

The actuator of the other torque coupling may simultaneously couple the end members to the centre members thereof by urging the face of the one end member of the other torque coupling against the one surface of the centre member thereof until engagement of the other surface of the centre member thereof with the face of the other end member of the other torque coupling. Further, the opposing surfaces of the centre member may be disposed at an acute angle relative to each other such that the centre member is thinner at its outer end than at its inner end.

The other torque coupling may comprise a centering mechanism that is coupled to the centre member thereof and is configured to urge the center member thereof away from the respective end members. The centering mechanism may comprise a ball bearing or a spring coupled to the torque input member. The radially inner end of the centre member of the other torque coupling may comprise a recess that is configured for capturing the centering mechanism therein.

The centre member of the other torque coupling may be selectively coupled to the torque input member via a cone coupling or a synchromesh gear set. The torque input member may comprise a torque input shaft, and a sun gear that is provided on the torque input shaft. The torque reactive member may comprise an annular gear, and the torque output member may comprise a planetary gear set or a coplanar reverted gear loop coupled to the annular gear and the sun gear.

The torque reactive member may comprise at least one axially-extending finger, and the clutch plates may be mounted on the finger and rotate with the torque reactive member. The one clutch plate may be axially movable along the finger, and the other clutch plate may be fixed to the finger. The end plates of the other torque coupling may rotate with the torque reactive member and may be axially movable along the splines.

BRIEF DESCRIPTION OF THE DRAWINGS

FIG. 3 is a magnified cross-sectional view of one of the torque couplings, depicting certain optional features thereof;

FIG. 4 is a three-quarter cross-sectional view of an attachment bracket for one of the torque couplings;

FIG. 5.1 is a longitudinal cross-sectional view of the transmission drive-line stage of FIG. 1, with both hydraulic actuators inactive and thereby providing the drive-line stage with a neutral gear;

FIG. 5.2 is a longitudinal cross-sectional view of the transmission drive-line stage with one of the hydraulic actuators active and thereby providing the drive-line stage with a $X^1$ gear-ratio;

FIG. 5.3 is a longitudinal cross-sectional view of the transmission drive-line stage with another one of the hydraulic actuators active and thereby providing the drive-line stage with a $X^0$ gear-ratio;

FIG. 10a is a magnified cross-sectional view of one of the torque couplings shown in FIG. 6, depicting one implementation of the optional centering mechanism thereof;

FIG. 10b is a magnified elevation of the centering mechanism depicted in FIG. 10a;

FIG. 11a is a magnified cross-sectional view of one of the torque couplings, depicting a second implementation of the optional centering mechanism;

FIG. 11b is a magnified elevation of the centering mechanism depicted in FIG. 11a;

FIG. 13 is a combined elevation and end view of the centre member of one of torque couplings, depicting certain optional features thereof;

FIG. 14 is a combined elevation and end view of one of the end members of one of torque couplings, depicting certain optional features thereof;

FIG. 15.1 is a longitudinal cross-sectional view of the transmission drive-line stage of FIG. 6, with the hydraulic actuator inactive and thereby providing the drive-line stage with a $X^1$ gear-ratio;

FIG. 15.2 is a longitudinal cross-sectional view of the transmission drive-line stage with another the hydraulic actuator active and thereby providing the drive-line stage with a $X^0$ gear-ratio;

DETAILED DESCRIPTION

Transmission Drive-Line Stage 100

Figure 1:
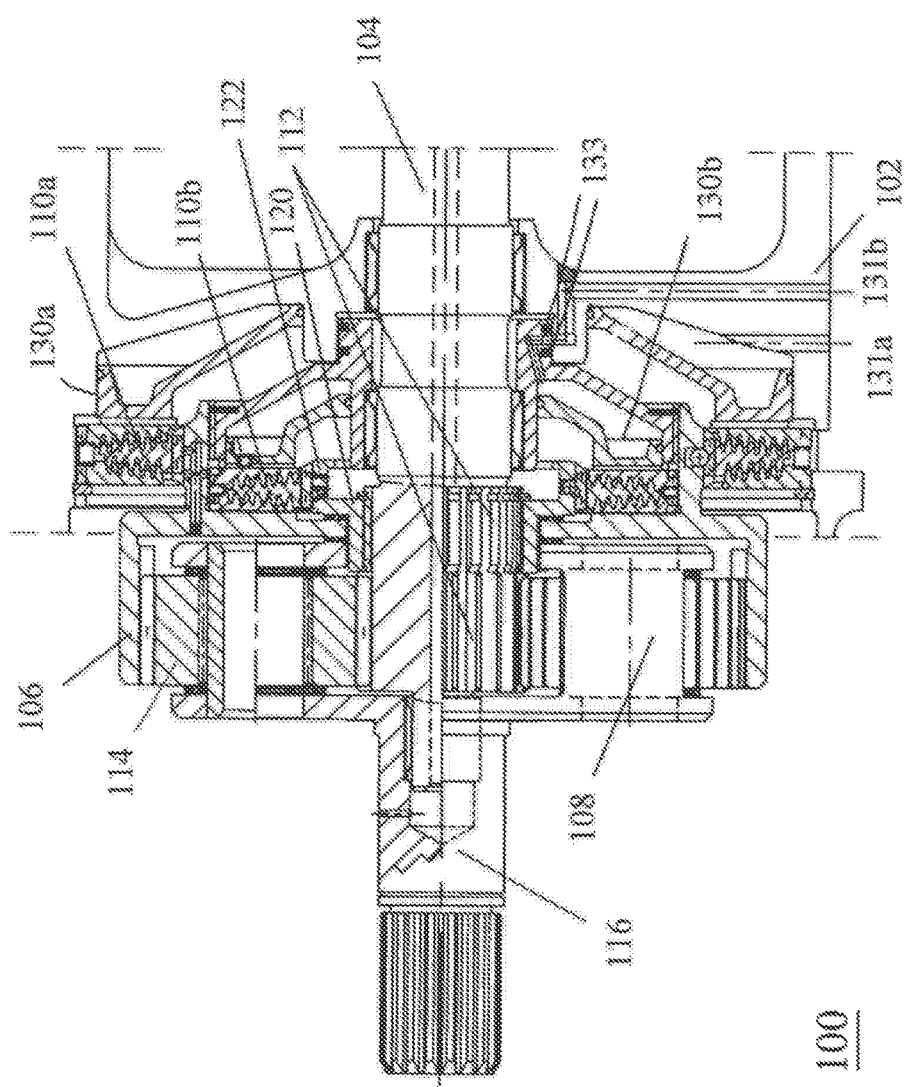
FIG. 1 is a longitudinal cross-sectional view of a transmission drive-line stage that includes a first embodiment of torque couplings.

Turning now to FIG. 1, a transmission drive-line stage, denoted generally as 100, is shown comprising a transmission housing (partially shown) 102, a torque input member, a torque reactive member, a torque output member, and a pair of torque couplings 110. The torque input member, the torque reactive member, the torque output member, and the torque couplings 110 are all disposed within the transmission housing 102. As will become apparent, the transmission drive-line stage 100, when installed in a vehicle, provides a neutral/vehicle launch capability.

The torque couplings 110 (denoted individually as 110a, 110b) are each configured to transfer torque between the torque input member and the torque output member. Further, when the torque couplings 110a, 110b are active, each torque coupling 110 provides a respective gear ratio between the torque input member and the torque output member.

In the embodiment shown, the torque input member comprises an input shaft 104, and a sun gear 112 that is integral with the input shaft 104. The input shaft 104 is supported in the transmission housing 102 by bearings that allow the input shaft 104 to rotate about its longitudinal axis. However, the sun gear 112 need not be integral with the input shaft 104 but may instead be coupled to the input shaft 104 by a clutch or synchromesh gear set.

In the embodiment shown, the torque reactive member comprises an annular gear 106, and the torque output member is configured as a planetary gear set. As such, the torque output member comprises a cage 108, a set of planetary gears 112, and an output shaft 116. The cage 108 is integral with the output shaft 116, and supports the planetary gears 112. The planetary gears 112 mesh with the annular gear 106 and the sun gear 112, and are retained in place within the annular gear 106 by the cage 108. The output shaft 116 is supported in the transmission housing 102 by bearings that allow the output shaft 116 to rotate about its longitudinal axis.

As shown, preferably the axis of rotation of the output shaft 116 coincides with the axis of rotation of the input shaft 104. However, the transmission drive-line stage 100 may be implemented using alternate orientations of the input shaft 104 and the output shaft 116.

Further, since the planetary gears 112 mesh with the annular gear 106 and the sun gear 112, the torque output member is thereby coupled to the torque input member and the torque reactive member. However, although the torque output member is shown configured as a planetary gear set, the torque output member may comprise alternate gear configurations, including the coplanar reverted gear loop previously described by the instant inventor in U.S. Pat. No. 6,126,566.

Figure 2:
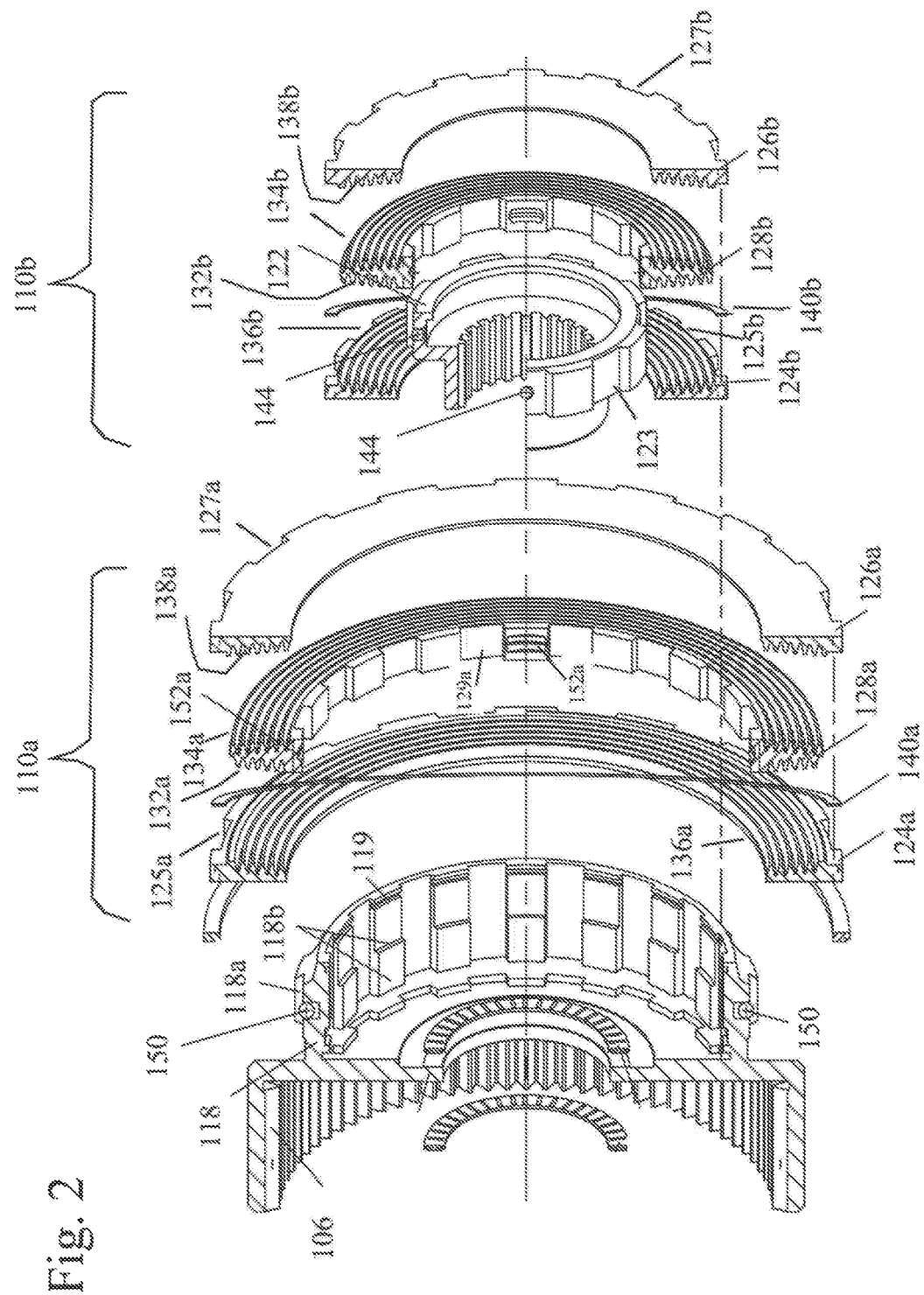
FIG. 2 is an exploded view of a longitudinal cross-section of the torque couplings depicted in FIG. 1.

As shown in FIG. 2, a continuous cylindrical axial extension 118 extends from the annular gear 106, and comprises an outer splined surface 118a, and an inner splined surface 118b. At the end of the axial extension 118 that is remote from the annular gear 106, the inner splined surface 118b includes a channel 119 for retaining a retaining ring therein. As shown, the inner splined surface 118b is stepped, such that the internal radius thereof is greater proximate the retaining channel 119 than proximate the annular gear 106.

Similarly, a cylindrical axial extension 120 (see FIG. 1) extends axially from the sun gear 112. A stepped attachment bracket 122 is coupled to the axial extension 120, and includes an outer splined surface 123.

The outermost torque coupling 110a comprises a pair of clutch end members 124a, 126a, a clutch centre member 128a, and an actuator 130a (FIG. 1). The centre member 128a is disposed between the clutch end members 124a, 126a, is preferably configured as a disc and, therefore, has a pair of opposing surfaces. One of the surfaces of the centre member 128a includes a plurality of concentric V-grooves 132a, and the opposite surface of the centre member 128a also includes a plurality of concentric V-grooves 134a. As shown, each V-groove 132a, 134a comprises a root disposed between adjacent peaks.

The centre member 128a also includes a splined inner end 129a that is configured for engagement with the outer splined surface 118a of the axial extension 118. As a result, the centre member 128a rotates with the annular gear 106, and is axially movable between the end members 124a, 126a along the outer surface of the axial extension 118.

The end members 124a, 126a are disposed around the outer surface of the axial extension 118. The left end member 124a includes a splined outer end 125a that is configured for engagement with an inner splined surface (not shown) of the transmission housing 102. Similarly, the right end member 126a includes a splined outer end 127a that is configured for engagement with the inner splined surface of the transmission housing 102. As a result, the end members 124a, 126a are fixed to the transmission housing 102, but are axially movable along the transmission housing 102 via the splined outer ends 125a, 127a.

Preferably, the outermost torque coupling 110a also includes a wave spring 140a that is disposed between the end members 124a, 126a, radially outwards from centre member 128a, and urges the end members 124a, 126a apart.

Each end member 124a, 126a is preferably configured as a disc and, therefore, has a pair of opposing faces. One of the faces of the left end member 124a is adjacent the clutch centre member 128a, and includes a set of concentric V-grooves 136a that is configured to mesh with the V-grooves 132a of the clutch centre member 128a. The opposite face of the left end member 124a is substantially planar. Similarly, one of the faces of the right end member 126a is adjacent the clutch centre member 128a, and includes a set of concentric V-grooves 138a that is configured to mesh with the V-grooves 134a of the clutch centre member 128a. The opposite face of the right end member 126a is substantially planar. Again, each V-groove 136a, 138a comprises a root disposed between adjacent peaks.

In the embodiment shown in FIG. 1, the actuator 130a is disposed adjacent the right end member 126a. The actuator 130a may be configured as a hydraulically-activated piston, a pneumatically-activated piston, or any other suitable pressure-fed actuator, and is activated by external feed line 131a. When activated, the actuator 130a is forced under pressure axially against the right end member 126a, which urges the V-grooves 136a, 138a of the end members 124a, 126a into engagement with the V-grooves 132a, 134a of the centre member 128a, and thereby couple the end members 124a, 126a and the centre member 128a together.

The inner torque coupling 110b comprises a pair of clutch end members 124b, 126b, a clutch centre member 128b, and an actuator 130b (FIG. 1). The centre member 128b is disposed between the clutch end members 124b, 126b, is preferably configured as a disc and, therefore, has a pair of opposing surfaces. One of the surfaces of the centre member 128b includes a plurality of concentric V-grooves 132b, and the opposite surface of the centre member 128b also includes a plurality of concentric V-grooves 134b. As shown, each V-groove 132b, 134b comprises a root disposed between adjacent peaks.

The centre member 128b also includes a splined inner end 129b that is configured for engagement with the outer splined surface 123 of the stepped attachment bracket 122. As a result, the centre member 128a rotates with the input shaft 104, and is axially movable between the end members 124b, 126b along the outer surface of the stepped attachment bracket 122.

The end members 124b, 126b are disposed around the outer surface of the stepped attachment bracket 122. The left end member 124b includes a splined outer end 125b that is configured for engagement with the inner splined surface 118b of the axial extension 118. Similarly, the right end member 126b includes a splined outer end 127b that is configured for engagement with the inner splined surface 118b of the axial extension 118. As a result, the end members 124b, 126b rotate with the annular gear 106.

Further, the left end member 124b is axially movable along the radially inner portion of the inner splined surface 118b (the portion of the inner splined surface 118b adjacent the annular gear 106), and the right end member 126b is axially movable along the radially outer portion of the inner splined surface 118b (the portion of the inner splined surface 118b between the step of the inner splined surface 118 and the retaining ring that is retained in the retaining channel 119). Preferably, the innermost torque coupling 110b also includes a wave spring 140b that is disposed between the end members 124b, 126b, radially outwards from centre member 128b, and urges the end members 124b, 126b apart.

Each end member 124b, 126b is preferably configured as a disc and, therefore, has a pair of opposing faces. One of the faces of the left end member 124b is adjacent the clutch centre member 128b, and includes a set of concentric V-grooves 136b that is configured to mesh with the V-grooves 132b of the clutch centre member 128b. The opposite face of the left end member 124b is substantially planar. Similarly, one of the faces of the right end member 126b is adjacent the clutch centre member 128b, and includes a set of concentric V-grooves 138b that is configured to mesh with the V-grooves 134b of the clutch centre member 128b. The opposite face of the right end member 126b is substantially planar. Again, each V-groove 136b, 138b comprises a root disposed between adjacent peaks.

In the embodiment shown in FIG. 1, the actuator 130b is disposed adjacent the right end member 126b. The actuator 130b may be configured as a hydraulically-activated piston, a pneumatically-activated piston, or any other suitable pressure-fed actuator, and is activated by external feed line 131b. Due to the inward location of the actuator 130b, the external feed line 131b extends to the actuator 130b through high pressure seals 133 that are disposed between the actuator 130a and the actuator 130b. When activated, the actuator 130b is forced under pressure axially against the right end member 126b, which urges the V-grooves 136b, 138b of the end members 124b, 126b into engagement with the V-grooves 132b, 134b of the centre member 128b, and thereby couple the end members 124b, 126b and the centre member 128b together.

FIG. 3 is a close-up view of one advantageous embodiment of the inner torque coupling 110b. Since the amount of force that is required to impart a particular torque to a disc decreases with the radius of the disc, the opposing surfaces of the centre member 128b may be disposed at an acute angle relative to each other, such that the centre member 128b is thinner at its radial outer end than at its radial inner end. Further, to facilitate the reduction in the thickness of the centre member, the roots of one opposing surface of the centre member 128b may be radially offset from the roots of the other opposing surface of the centre member 128b. Still, as shown, the faces of the end members 124b, 126b adjacent the clutch centre member 128b are parallel to the associated surfaces of the centre member 128b.

Preferably, one or both of the torque couplings 110 comprise a centering mechanism that is coupled to the respective centre member 128 and is configured to urge the center member 128 away from the associated end members 124, 126 upon deactivation of the actuator 130. The centering mechanism may comprise a ball bearing, or a spring. For example, as shown in FIG. 4, the outer splined surface 123 of the stepped attachment bracket 122 may be configured with a plurality of wells 142, each having a crimp 143 for retaining a respective ball bearing 144 therein, and the radially inner end of the centre member 128b of the innermost torque coupling 110b may comprise a recess 152b that is configured for capturing a portion of the ball bearing 144. As shown in FIG. 3, the recess 152b may comprise a V-shaped pocket.

Similarly, the outer splined surface 118a of the axial extension 118 may be configured with a plurality of wells 148, each having a crimp 149 for retaining a respective ball bearing 150 therein, and the radially inner end of the centre member 128a of the outermost torque coupling 110a may comprise a recess 152a that is configured for capturing a portion of the ball bearing 150. As shown in FIG. 2, the recess 152a may comprise a V-shaped pocket.

Preferably, the centre member 128 of one or both of the torque couplings 110 comprises at least one oil passage that is configured to facilitate a cascading oil flow to the V-grooves 136, 138 of the associated end members 124, 126. Therefore, the centre member 128 may comprise at least one oil passage that extends radially through a plurality of the roots of the V-grooves 132, 134 towards the radial inner end of the centre member 128. Preferably, the centre member 128 comprises a plurality of the oil passages, each extending through a respective number of the roots of the V-grooves 132, 134 in accordance with the angular position of the oil passage.

Preferably, one or both of the end members of one or both of the torque couplings 110 comprises at least one oil passage that is configured to provide a flow of oil to the V-grooves of the centre member 128 even when the planar face of the end member abuts against a fixed transmission component.

For instance, the oil passage may be provided in the right end member 126b of the innermost torque coupling 110b. As shown in FIG. 3, the oil passage comprises a through-hole 154b that extends axially from one of the roots of the V-grooves 138b towards the planar face thereof, and a slot 155b that is provided in the planar face and extends radially from the through-hole 154b towards the radial inner end of the right end member 126b. Preferably, the end member is provided with a plurality of the oil passages, with the through-hole of each oil passage being disposed at varying radial positions around the end member.

Gear Ratio Transitions of Transmission Drive-Line Stage 100

FIG. 5.1 depicts the transmission drive-line stage 100, with both hydraulic actuators 130 inactive. In this mode, the wave spring 140a of the outermost torque coupling 110a urges the end members 124a, 126a apart. Since, in this mode, the actuator 130a does not apply any axial forces to the centre member 128a, the ball bearing 150 (captured within the axial extension 118a) remains substantially centred within the recess 152a of the centre member 128a. As a result, the ball bearing 150 provides a centering action that maintains the centre member 128a away from the end members 124a, 126a, thereby disengaging the V-grooves 132a, 134a of the centre member 128a from the V-grooves 136a, 138a of the end members 124a, 126a, and uncoupling the centre member 128a from the end members 124a, 126a.

Similarly, the wave spring 140b of the innermost torque coupling 110b urges the end members 124b, 126b apart. Since, in this mode, the actuator 130b does not apply any axial forces to the centre member 128b, the ball bearing 144 (captured within the axial extension 120) remains substantially centred within the recess 152b of the centre member 128b. As a result, the ball bearing 144 provides a centering action that maintains the centre member 128b away from the end members 124b, 126b, thereby disengaging the V-grooves 132b, 134b of the centre member 128b from the V-grooves 136b, 138b of the end members 124b, 126b, and uncoupling the centre member 128b from the end members 124b, 126b.

Therefore, in the mode depicted in FIG. 5.1, the torque of the input shaft 104 is not transmitted to the output shaft 116 by either of the torque couplings 110a, 110b, thereby providing the transmission drive-line stage 100 with a neutral gear.

FIG. 5.2 depicts the transmission drive-line stage 100, with the actuator 130a of the outermost torque coupling 110a active, and the actuator 130b of the innermost torque coupling 110b inactive. In this mode, the actuator 130a urges the right end member 126a towards the left end member 124a, thereby compressing the wave spring 140a of the outermost torque coupling 110a between the end members 124a, 126a. This axial movement of the right end member 126a urges the V-grooved face of the right end member 126a against the associated surface of the centre member 128a, thereby axially urging the centre member 128a towards the left end member 124a until the opposite surface of the centre member 128a engages the associated V-grooved face of the left end member 124a. At the same time, the ball bearing 150 (captured within the axial extension 118a) becomes displaced from the centre of the recess 152a of the centre member 128a. As a result, the V-grooves 132a, 134a of the centre member 128a engage the V-grooves 136a, 138a of the end members 124a, 126a, thereby coupling the centre member 128a to the end members 124a, 126a.

Since the actuator 130b is inactive, the wave spring 140b of the innermost torque coupling 110b urges the end members 124b, 126b apart. Since, in this mode, the actuator 130b does not apply any axial forces to the centre member 128b, the ball bearing 144 (captured within the axial extension 120) remains substantially centred within the recess 152b of the centre member 128b. As a result, the ball bearing 144 provides a centering action that maintains the centre member 128b away from the end members 124b, 126b, thereby disengaging the V-grooves 132b, 134b of the centre member 128b from the V-grooves 136b, 138b of the end members 124b, 126b, and uncoupling the centre member 128b from the end members 124b, 126b.

Since the end members 124a, 126a are fixed to the transmission housing 102, and the centre member 128a is coupled to and rotates with the axial extension 118a, the annular gear 106 becomes grounded to the transmission housing 102 via the outermost torque coupling 110a, thereby causing the planetary gears 114 to rotate relative to the annular gear 106 when the sun gear 112 rotates. As a result, in the mode depicted in FIG. 5.2, the torque of the input shaft 104 is transmitted to the output shaft 116 through the sun gear 112, the planetary gears 114, the annular gear 106 and the cage 108, thereby providing the transmission drive-line stage 100 with a gear-ratio $X^1$ that is determined by the relative sizes of the sun gear 112, the planetary gears 114 and the annular gear 106.

FIG. 5.3 depicts the transmission drive-line stage 100, with the actuator 130a of the outermost torque coupling 110a inactive, and the actuator 130b of the innermost torque coupling 110b active. In this mode, the actuator 130b urges the right end member 126b towards the left end member 124b, thereby compressing the wave spring 140b of the innermost torque coupling 110b between the end members 124b, 126b. This axial movement of the right end member 126b urges the V-grooved face of the right end member 126b against the associated surface of the centre member 128b, thereby axially urging the centre member 128b towards the left end member 124b until the opposite surface of the centre member 128b engages the associated V-grooved face of the left end member 124b. At the same time, the ball bearing 144 (captured within the axial extension 122) becomes displaced from the centre of the recess 152b of the centre member 128b. As a result, the V-grooves 132b, 134b of the centre member 128b engage the V-grooves 136b, 138b of the end members 124b, 126b, thereby coupling the centre member 128b to the end members 124b, 126b.

Since the actuator 130a is inactive, the wave spring 140a of the outermost torque coupling 110a urges the end members 124a, 126a apart. Since, in this mode, the actuator 130a does not apply any axial forces to the centre member 128a, the ball bearing 150 (captured within the axial extension 118a) remains substantially centred within the recess 152a of the centre member 128a. As a result, the ball bearing 150 provides a centering action that maintains the centre member 128a away from the end members 124a, 126a, thereby disengaging the V-grooves 132a, 134a of the centre member 128a from the V-grooves 136a, 138a of the end members 124a, 126a, and uncoupling the centre member 128a from the end members 124a, 126a.

Since the end members 124b, 126b are coupled to and rotate with the axial extension 118b, and the centre member 128b is coupled to and rotates with the axial extension 122, the input shaft 104 becomes coupled to the annular gear 106 via the innermost torque coupling 110b, thereby causing the planetary gears 114 to rotate in unison with the annular gear 106 when the sun gear 112 rotates. As a result, in the mode depicted in FIG. 5.3, the torque of the input shaft 104 is transmitted to the output shaft 116 through the sun gear 112, the planetary gears 114 and the cage 108, thereby providing the transmission drive-line stage 100 with a 1:1 gear-ratio X°.

As will be apparent, each torque coupling 110a, 110b provides a respective gear ratio between the torque input member and the torque output member of the transmission drive-line stage 100. However, since the actuators 130 of the torque coupling 110 are operable independently of each other, to avoid damage to the transmission drive-line stage 100 the torque couplings 110 should not be fully engaged simultaneously. Rather, activation of one of the torque couplings 110a, 110b should be coordinated with deactivation of the other of the torque couplings 110a, 110b to avoid discontinuity during the transition between the gear ratios.

Transmission Drive-Line Stage 200

Figure 6:
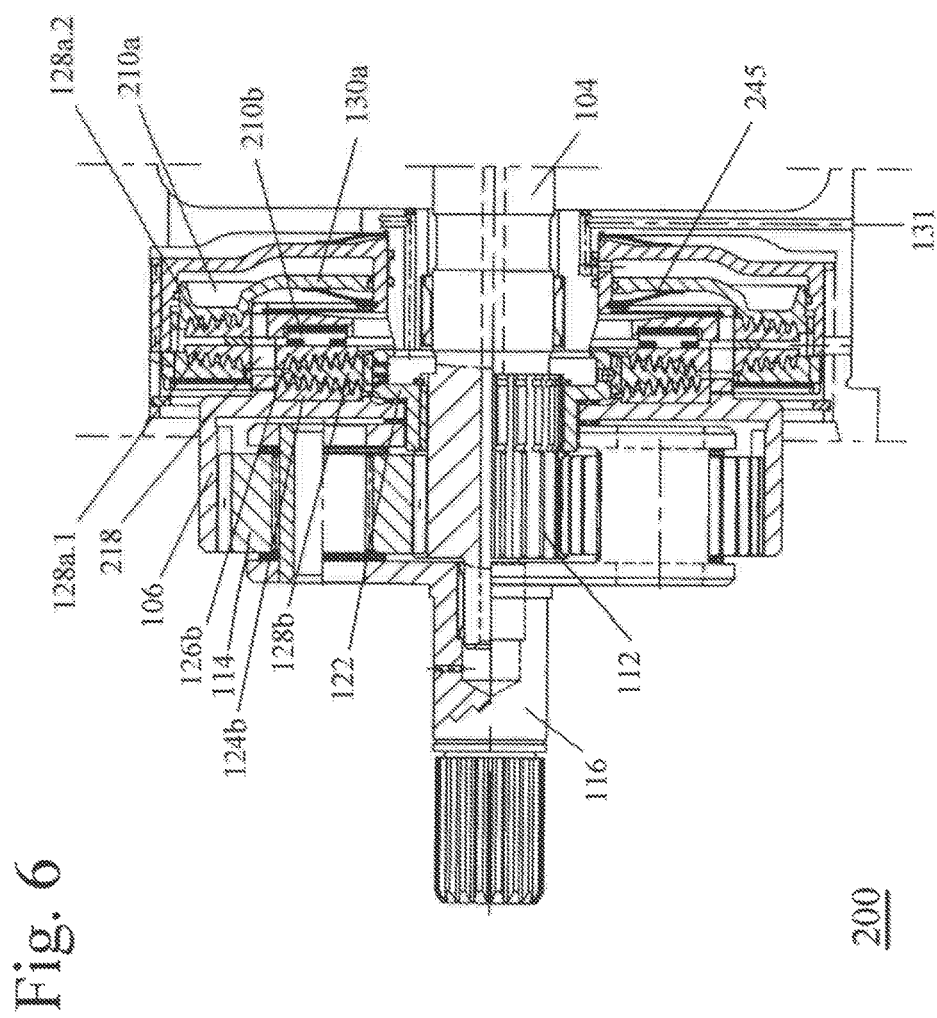
FIG. 6 is a longitudinal cross-sectional view of a transmission drive-line stage that includes a second embodiment of torque couplings.

An alternate transmission drive-line stage, denoted generally as 200, is shown in FIG. 6. Apart from the torque couplings, the transmission drive-line stage 200 is substantially similar to the transmission drive-line stage 100. However, in contrast to the transmission drive-line stage 100, the transmission drive-line stage 200, when installed in a vehicle, does not provide a neutral/vehicle launch capability.

The transmission drive-line stage 200 comprises the transmission housing (partially shown) 102, the torque input member, the torque reactive member, the torque output member, and a pair of torque couplings 210. The torque input member, the torque reactive member, the torque output member, and the torque couplings 210 are all disposed within the transmission housing 102. In the embodiment shown in FIG. 6, the torque input member again comprises the input shaft 104, and the sun gear 112 integral with the input shaft 104. However, as will be described below, the sun gear 112 need not be integral with the input shaft 104 but may instead be coupled to the input shaft 104 by a clutch or synchromesh gear set.

In the embodiment shown, the torque reactive member comprises the annular gear 106, and the torque output member is again configured as a planetary gear set. As such, the torque output member comprises the cage 108, the set of planetary gears 112, and the output shaft 116. However, as previously discussed, the torque output member may comprise alternate gear configurations, including the coplanar reverted gear loop previously described by the instant inventor in U.S. Pat. No. 6,126,566.

Figure 7:
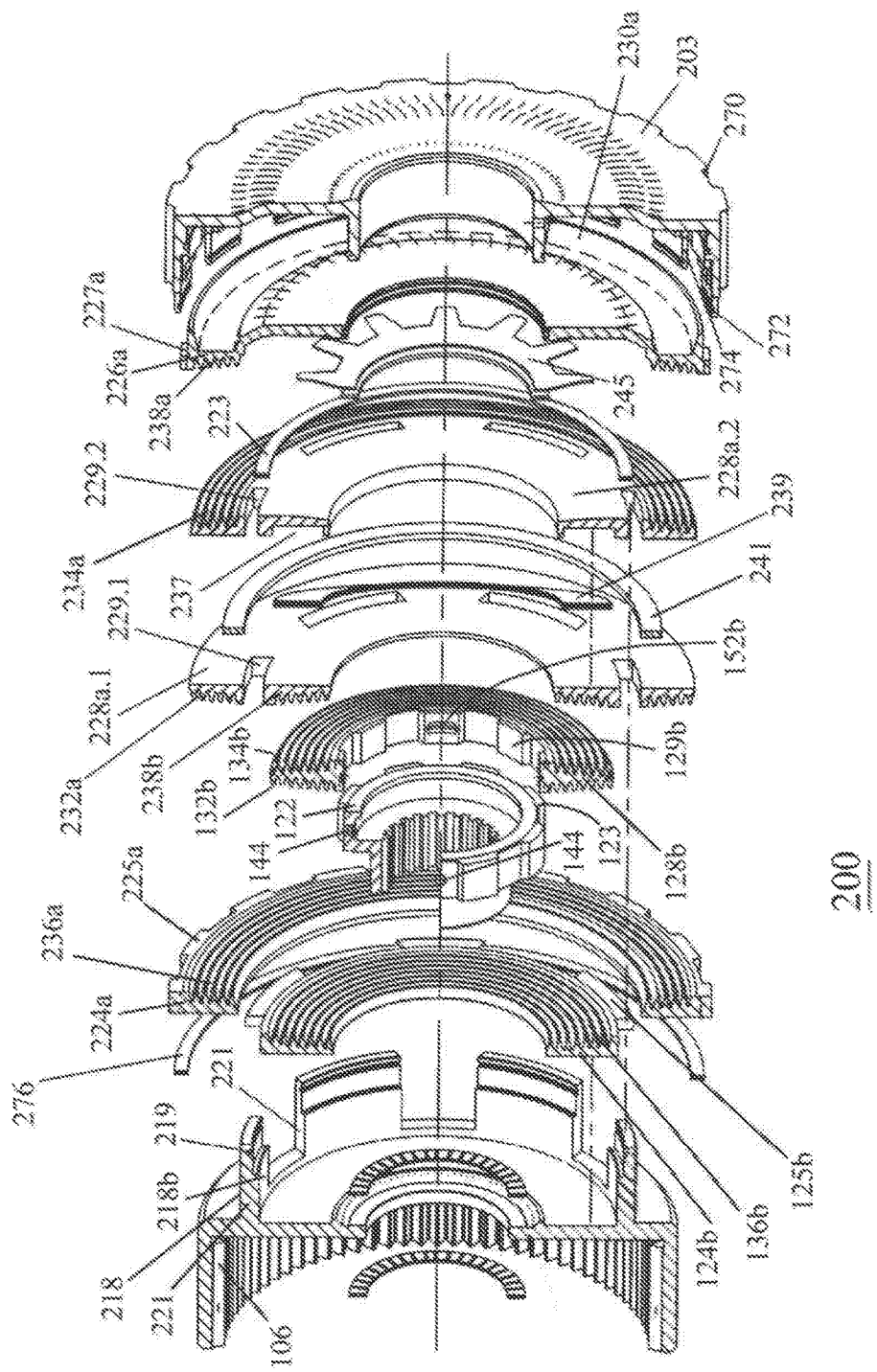
FIG. 7 is an exploded view of a longitudinal cross-section of the torque couplings depicted in FIG. 6.

As shown in FIG. 7, a cylindrical axial extension 218 extends from the annular gear 106, and comprises a smooth outer surface, and an inner stepped surface 218b. At the end of the axial extension 218 that is remote from the annular gear 106, the inner stepped surface 218b includes a channel 219 for retaining a retaining ring 223 therein. As shown, the internal radius of the inner stepped surface 218b is greater proximate the retaining channel 219 than proximate the annular gear 106. The axial extension 218 is also segmented around its circumference and, therefore, comprises a plurality of arcuate fingers 221 that extend axially from the annular gear 106.

The torque couplings 210 are disposed within a substantially cylindrical case 203. The cylindrical case 203 is disposed within the transmission housing 102, and comprises a planar end wall and a side wall. The side wall comprises a splined outer surface 270, and a stepped inner surface. At the end of the side wall that is remote from the end wall, the stepped inner surface includes a channel 272 for retaining a retaining ring 276 therein. The side wall of the cylindrical case 203 is also segmented around its circumference and, therefore, comprises a plurality of arcuate fingers 274 that extend axially from the end wall towards the annular gear 106.

Figure 8:
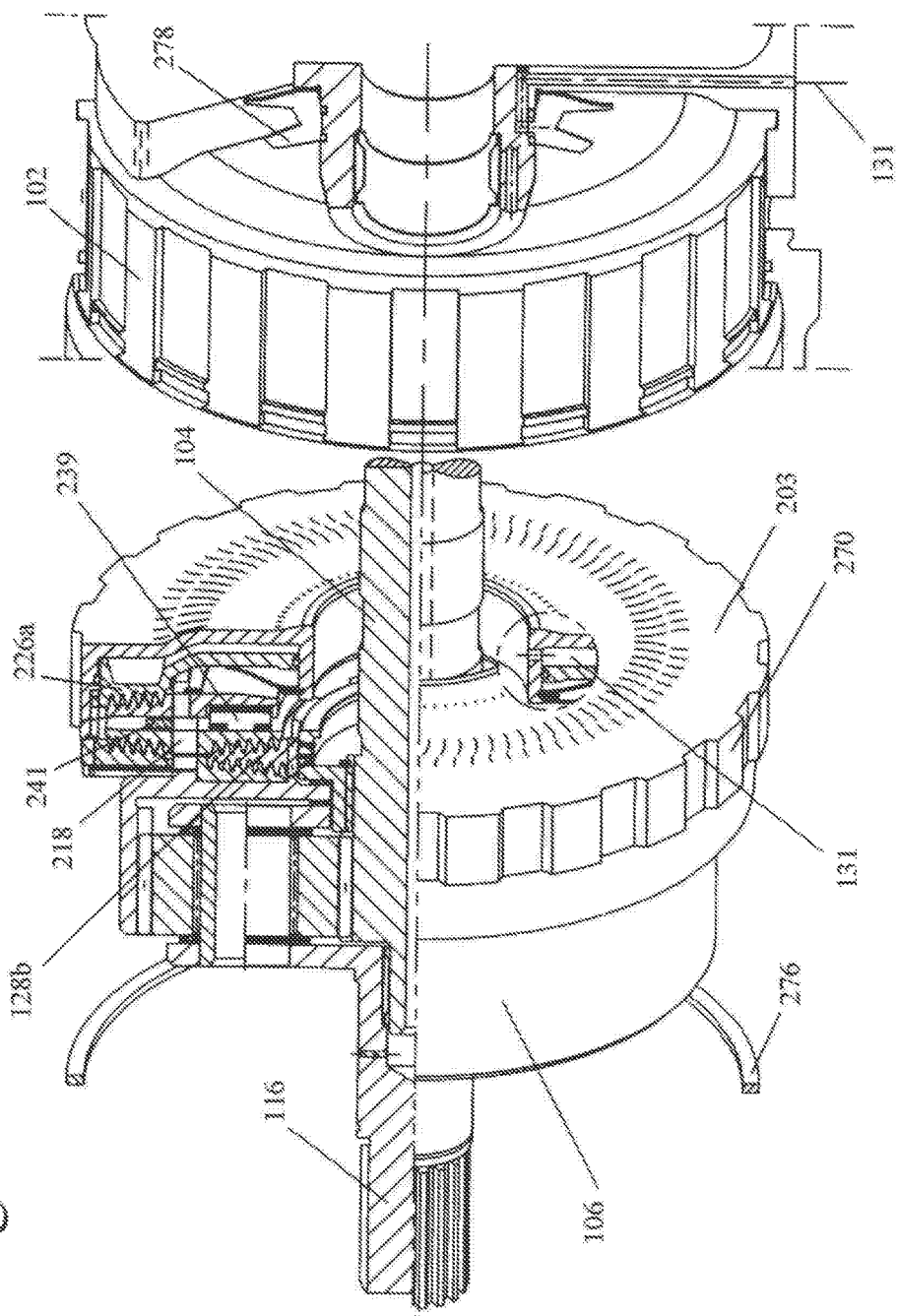
FIG. 8 is an exploded view of the torque couplings, depicting certain additional features thereof.

The splined outer surface 270 engages the inner splined surface of the transmission housing 102 (see FIG. 8). A finger spring 278 is provided between the transmission housing 102 and the end wall of the cylindrical case 203, and urges the cylindrical case 203 axially away from the transmission housing 102. As a result, the cylindrical case 203 is prevented from rotated relative to the transmission housing 102, but is axially movable within the transmission housing 102 via the splined outer surface 270.

The outermost torque coupling 210a comprises a pair of clutch end members 224a, 226a, and a pair of co-joined clutch centre members 228a.1, 228a.2. The centre members 228a are disposed axially side-by-side between the clutch end members 224a, 226a. Each centre member 228a.1, 228a.2 is preferably configured as a disc or clutch plate and, therefore, has a pair of opposing surfaces.

One of the surfaces of the left centre member 228a.1 is substantially planar. The opposite surface of the left centre member 228a.1 includes a plurality of concentric V-grooves 232a that are disposed proximate the radial outer end of the centre member 228a.1, and a set of concentric V-grooves 238b that are disposed proximate the radial inner end of the centre member 228a.1. As shown, each V-groove 232a, 238b comprises a root disposed between adjacent peaks.

The left centre member 228a.1 also includes a plurality of arcuate slots 229.1, disposed radially between the V-grooves 232a and the V-grooves 238a, that are configured to receive the arcuate fingers 221 of the axial extension 218 therein. As a result, the left centre member 228a.1 rotates with the annular gear 106. The inner stepped surface 218b of the axial extension 218 is dimensioned to allow the left centre member 228a.1 to move axially with respect to the right centre member 228a.2, along the portion of the arcuate fingers 221 substantially between the annular gear 106 (as limited by the thickness of the left end member 224a) and the step of the inner stepped surface 218b.

One of the surfaces of the right centre member 228a.2 includes a plurality of concentric V-grooves 234a disposed proximate the radial outer end thereof. The opposite surface of the right centre member 228a.2 includes a substantially planar face proximate the radial outer end of the centre member 228a.2, and a continuous channel 237 proximate the radial inner end of the centre member 228a.2. As shown, each V-groove 234a comprises a root disposed between adjacent peaks.

The right centre member 228a.2 also includes a plurality of arcuate slots 229.2, disposed radially between the V-grooves 234a and the continuous channel 237, that are configured to receive the arcuate fingers 221 of the axial extension 218 therein. As a result, the right centre member 228a.2 rotates in unison about a common axis with the annular gear 106 and the left centre member 228a.1. However, the inner stepped surface 218b of the axial extension 218 is dimensioned to confine the right centre member 228a.2 to the portion of the arcuate fingers 221 between the step of the inner stepped surface 218b and the retaining ring 223 that is retained in the retaining channel 219. As a result, the inner stepped surface 218b is configured to prevent the right centre member 228a.2 from moving axially along the arcuate fingers 221.

A wave spring 239 is disposed between the left centre member 228a.1 and the right centre member 228a.2, within the continuous channel 237, and urges the left centre member 228a.1 axially away from the right centre member 228a.2 along the arcuate fingers 221. A flat ring 241 is also disposed between the left centre member 228a.1 and the right centre member 228a.2, radially outwards from the wave spring 239, and limits the minimum axial separation between the left centre member 228a.1 and the right centre member 228a.2.

The end members 224a, 226a are disposed around the outer surface of the axial extension 218. The left end member 224a includes a splined outer end 225a that is configured for engagement with the axially-extending fingers 274 of the cylindrical case 203. Further, the splined outer end 225a is axially fixed to the radially outermost portion of the stepped inner surface of the cylindrical case 203 (the portion of the inner splined surface 118b between the step of the inner stepped surface and the retaining ring 276 that is retained in the retaining channel 272).

Similarly, the right end member 226a includes a splined outer end 227a that is configured for engagement with the axially-extending fingers 274. However, the splined outer end 227a is axially movable within the radially innermost portion of the stepped inner surface of the cylindrical case 203 (the portion of the inner splined surface 118b substantially between the step of the inner stepped surface and the end wall of the cylindrical case 203). As a result, the end members 224a, 226a rotate with the cylindrical case 203, and the right end member 226a is axially movable within the cylindrical case 203.

Each end member 224a, 226a is preferably configured as a disc and, therefore, has a pair of opposing faces. One of the faces of the left end member 224a is adjacent the left centre member 228a.1, and includes a set of concentric V-grooves 236a that is configured to mesh with the V-grooves 232a of the left centre member 228a.1. The opposite face of the left end member 224a is substantially planar. Similarly, one of the faces of the right end member 226a is adjacent the right centre member 228a.2, and includes a set of concentric V-grooves 238a that is configured to mesh with the V-grooves 234a of the right centre member 228a.2. The opposite face of the right end member 226a is substantially planar. Again, each V-groove 236a, 238a comprises a root disposed between adjacent peaks.

The cylindrical case 203 is provided with a finger spring 245 that urges the right end member 226a axially towards the end wall of the cylindrical case 203. The substantially planar face of the right end member 226a includes an axially-extending apron that is disposed around the circumference of the right end member 226a, radially inwards of the side wall of the cylindrical case 203. The apron, together with the cylindrical case 203, functions as an actuator 230a. The actuator 230a may be configured as a hydraulically-activated piston, a pneumatically-activated piston, or any other suitable pressure-fed actuator, and is activated by external feed line 131a. When activated, the actuator 230a forces the right end member 226a axially against the right centre member 228a.2, and pulls the left end member 224a axially against the left centre member 228a.1, which causes the V-grooves 236a, 238a of the end members 224a, 226a to engage the V-grooves 232a, 234a of the centre members 228a, and thereby couple the end members 224a, 226a and the centre members 228a together.

The inner torque coupling 210b comprises the clutch left end member 124b, the radially inner portion of the left centre member 228a.1, the clutch centre member 128b, and the wave spring 239 (functions as an actuator). The centre member 128b is disposed between the clutch end member 124b and the left centre member 228a.1, is preferably configured as a disc and, therefore, has a pair of opposing surfaces. One of the surfaces of the centre member 128b includes a plurality of concentric V-grooves 132b, and the opposite surface of the centre member 128b also includes a plurality of concentric V-grooves 134b. As shown, each V-groove 132b, 134b comprises a root disposed between adjacent peaks.

The centre member 128b also includes a splined inner end 129b that is configured for engagement with the outer splined surface 123 of the stepped attachment bracket 122. As a result, the centre member 128a rotates with the input shaft 104, and is axially movable between the end member 124b and the left centre member 228a.1, along the outer surface of the stepped attachment bracket 122.

The left end member 124b and the radially inner portion of the left centre member 228a.1 are disposed around the outer surface of the stepped attachment bracket 122. The left end member 124b includes a splined outer end 125b that is configured for engagement with the axially-extending fingers 221 of the axial extension 218. As a result, the left end member 124b and the left centre member 228a.1 rotate in unison with the annular gear 106.

Further, the left end member 124b is axially movable along the portion of the arcuate fingers 221 substantially between the annular gear 106 and the step of the inner stepped surface 218b (as limited by the thickness of the centre member 128b). As mentioned, the left centre member 228a.1 is axially movable along the portion of the arcuate fingers 221 substantially between the annular gear 106 (as limited by the thickness of the left end member 224a) and the step of the inner stepped surface 218b.

The left end member 124b is preferably configured as a disc and, therefore, has a pair of opposing faces. One of the faces of the left end member 124b is adjacent the clutch centre member 128b, and includes a set of concentric V-grooves 136b that is configured to mesh with the V-grooves 132b of the clutch centre member 128b. The opposite face of the left end member 124b is substantially planar. Similarly, the set of concentric V-grooves 238b that is provided on the radially inner portion of the left centre member 228a.1 is configured to mesh with the V-grooves 134b of the clutch centre member 128b. Again, each V-groove 136b, 238b comprises a root disposed between adjacent peaks.

Unlike the innermost torque coupling 110b of the transmission drive-line stage 100, the innermost torque coupling 210b does not include its own independently-operable actuator. Instead, as mentioned, the actuator for the torque coupling 210b comprises the wave spring 239. When the actuator 230a of the outermost torque coupling 210a is inactive, the wave spring 239 forces the left centre member 228a.1 axially against the centre member 128b which, in turn, forces the centre member 128b axially against the left end member 124b. As a result, the V-grooves 136b, 238b engage the V-grooves 132b, 134b of the centre member 128b, thereby coupling the end members 124b, the left centre member 228a.1, and the centre member 128b together.

Figure 9:
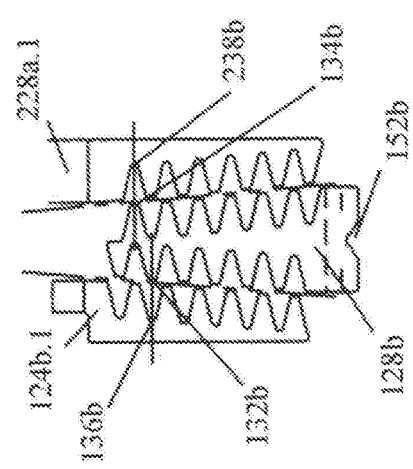
FIG. 9 is a magnified cross-sectional view of one of the torque couplings shown in FIG. 6, depicting certain optional features thereof.

FIG. 9 is a close-up view of one advantageous embodiment of the inner torque coupling 210b. As discussed, since the amount of force that is required to impart a particular torque to a disc decreases with the radius of the disc, the opposing surfaces of the centre member 128b may be disposed at an acute angle relative to each other, such that the centre member 128b is thinner at its radial outer end than at its radial inner end. Further, to facilitate the reduction in the thickness of the centre member, the roots of one opposing surface of the centre member 128b may be radially offset from the roots of the other opposing surface of the centre member 128b.

Preferably, one of both of the torque couplings 210 comprises a centering mechanism that is coupled to the centre member and is configured to urge the center member away from the end members. The centering mechanism may comprise a ball bearing. For example, as shown in FIGS. 10a, 10b, the outer splined surface 123 of the stepped attachment bracket 122 may be configured with a plurality of wells 142, each having a crimp 143 for retaining a respective ball bearing 144 therein, and the radially inner end of the centre member 128b of the innermost torque coupling 210b may comprise a recess 152b that is configured for capturing a portion of the ball bearing 144 therein. As shown, the recess 152b may comprise a V-shaped pocket.

Figure 12:
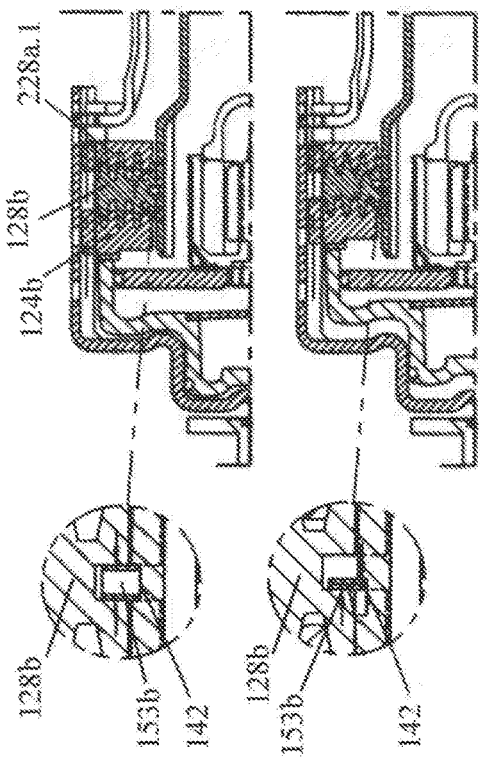
FIG. 12 is a magnified cross-sectional view of one of the torque couplings, depicting a third implementation of the optional centering mechanism

Alternately, the centering mechanism may comprise a spring. For example, as shown in FIGS. 11a, 11b, the outer splined surface 123 of the stepped attachment bracket 122 may be configured with a spoon-shaped spring 153a, and the radially inner end of the centre member 128b of the innermost torque coupling 210b may comprise a recess 152b that is configured for capturing a portion of the spring 153a therein. FIG. 12 depicts a variation in which the centering mechanism comprises a wave spring 153b.

Preferably, the centre member comprises at least one oil passage that is configured to facilitate a cascading oil flow to the V-grooves of the associated end members. Therefore, as shown in FIG. 13, the centre member 128b may comprise at least one oil passage 280 that extends radially through a plurality of the roots of the V-grooves 132b, 134b towards the radial inner end of the centre member 128b. Preferably, the centre member 128b comprises a plurality of the oil passages 280, each extending through a respective number of the roots of the V-grooves 132b, 134b in accordance with the angular position of the respective oil passage 280.

Preferably, one or both of the end members of one or both of the torque couplings 210 comprises at least one oil passage that is configured to provide a flow of oil to the V-grooves of the centre member even when the planar face of the end member abuts against a fixed transmission component. For instance, the oil passage may be provided in the left end member 124b of the innermost torque coupling 210b. As shown in FIG. 14, the oil passage may comprise a through-hole 154b that extends axially from one of the roots of the V-grooves 136b towards the planar face thereof, and a slot 155b that is provided in the planar face and extends radially from the through-hole 154b towards the radial inner end of the left end member 124b. Preferably, the end member 124b is provided with a plurality of the oil passages, with the through-hole 154b of each oil passage being disposed at varying radial positions around the end member 124b.

Gear Ratio Transitions of Transmission Drive-Line Stage 200

FIG. 15.1 depicts the transmission drive-line stage 200, with the actuator 230a inactive. In this mode, the wave spring 239 axially urges the left centre member 228a.1 towards the left end member 124b. This axial movement of the left centre member 228a.1 urges the radially innermost V-grooved face of the left centre member 228a.1 against the associated surface of the centre member 128b, thereby axially urging the centre member 128b towards the left end member 124b until the opposite surface of the centre member 128b engages the associated V-grooved face of the left end member 124b. At the same time, the ball bearing 144 (captured within the axial extension 122) becomes displaced from the centre of the recess 152b of the centre member 128b. As a result, the V-grooves 132b, 134b of the centre member 128b engage the V-grooves 136b of the left end member 124b and the V-grooves 136b 238b of the left centre members 228a.1, thereby coupling the centre member 128b to the members 124b, 228a.1.

At the same time, the finger spring 245 urges the right end member 226a away from the right centre member 228a.2, and the finger spring 278 urges the cylindrical case 203 (and hence the left end member 224a) towards the annular gear 106. Although the wave spring 239 urges the left centre member 228a.1 towards the left end member 124b, the width of the centre member 128b causes the left centre member 228a.1 to remain axially displaced from the left end member 224a. As a result, the centre members 228a are axially separated from the end members 224a, 226a, thereby disengaging the V-grooves 232a, 234a of the centre members 228a from the V-grooves 236a, 238a of the end members 224a, 226a, and uncoupling the centre members 228a from the end members 224a, 226a.

Since the members 124b, 228a.1 are coupled to and rotate with the axial extension 218, and the centre member 128b is coupled to and rotates with the axial extension 122, the input shaft 104 becomes coupled to the annular gear 106 via the innermost torque coupling 210b, thereby causing the planetary gears 214 to rotate in unison with the annular gear 106 when the sun gear 112 rotates. As a result, in the mode depicted in FIG. 5.1, the torque of the input shaft 104 is transmitted to the output shaft 116 through the sun gear 112, the planetary gears 214 and the cage 108, thereby providing the transmission drive-line stage 200 with a 1:1 gear-ratio $X^o$.

FIG. 15.2 depicts the transmission drive-line stage 200, with the actuator 230a active. In this mode, the actuator 230a urges the right end member 226a axially towards the right centre member 228a.2. The actuator 230a also urges the cylindrical case 203 axially away from the annular gear 106, thereby pulling the left end member 224a axially towards the left centre member 228a.1. At the same time, the left centre member 228a.1 is urged axially towards the right centre member 228a.2, thereby compressing the wave spring 239 between the centre members 228a.

This axial movement of the end members 224a, 226a simultaneously urges the V-grooved face of the left end member 224a against the associated surface of the left centre member 228a.1, and the V-grooved face of the right end member 226a against the associated surface of the right centre member 228a.2, until the left centre member 228a.1 engages the associated V-grooved face of the left end member 224a and the right centre member 228a.2 engages the associated V-grooved face of the right end member 226a. As a result, the V-grooves 232a, 234a of the centre members 228a engage the V-grooves 236b, 238b of the end members 224a, 226a, thereby coupling the centre members 228a to the end members 224a, 226a.

At the same time as the left centre member 228a.1 moves towards the right centre member 228a.2, the left centre member 228a.1 is urged axially away from the centre member 128b, thereby allowing the ball bearing 144 (captured within the axial extension 122) to return to the centre of the recess 152b of the centre member 128b. The ball bearing 144 provides a centering action that maintains the centre member 128b away from the left end member 124b and the left centre member 228a.1, thereby disengaging the V-grooves 132b, 134b of the centre member 128b from the V-grooves 136b, 238b of the members 124b, 228a.1, and uncoupling the centre member 128b from the members 124b, 228a.1.

Since the end members 224a, 226a are fixed to the transmission housing 102 via the cylindrical case 203, and the centre members 228a are coupled to and rotate with the axial extension 218, the annular gear 106 becomes grounded to the transmission housing 102 via the outermost torque coupling 210a, thereby causing the planetary gears 214 to rotate relative to the annular gear 106 when the sun gear 112 rotates. As a result, in the mode depicted in FIG. 5.2, the torque of the input shaft 104 is transmitted to the output shaft 116 through the sun gear 112, the planetary gears 214, the annular gear 106 and the cage 108, thereby providing the transmission drive-line stage 200 with a gear-ratio $X^1$ that is determined by the relative sizes of the sun gear 112, the planetary gears 214 and the annular gear 106.

As will be apparent, each torque coupling 210a, 210b provides a respective gear ratio between the torque input member and the torque output member of the transmission drive-line stage 200. However, since the activations and deactivations of the torque couplings 210 are coordinated internally, the transition between the gear ratios may be effected without separate external controls for each torque coupling 210a, 210b. Moreover, since the drive-line stage 200 only includes a single actuator 130a, and the cylindrical case 203 does not rotate relative to the transmission housing 102, the transition between the gear ratios is effected without the dynamic high pressure seals of the transmission drive-line stage 100, but is instead effected using static seals.

The actuator 230a and the springs 239, 245, 278 are configured to limit drive-line torque discontinuity during the transition between the gear ratios. As a result, the actuator 230a couples the end members 224a, 226a and the centre members 228a of the outermost torque coupling 210a in synchronism with the uncoupling of the members 124a, 228a.1 and the centre member 128b of the innermost torque coupling 210b (and vice versa), such that an increase in torque between the end members and the centre member in one of the torque couplings 210a, 210b is accompanied by a corresponding decrease in torque between the end members and the centre member in the other torque coupling 210a, 210b.

Variations in Torque Input Member of Transmission Drive-Line Stage 200

Figure 16A:
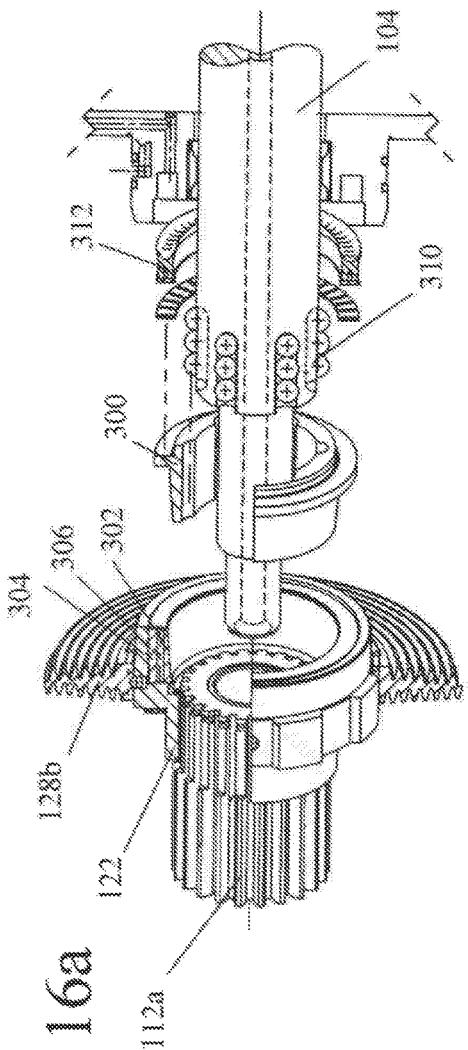
FIG. 16a is a three-quarter cross-sectional view of an optional cone coupling for one of the torque couplings depicted in FIG. 6.
Figure 16C:
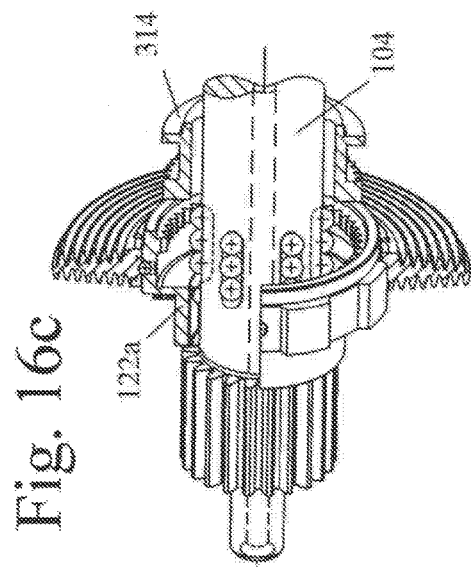
FIG. 16c is a three-quarter cross-sectional view of an optional synchromesh gear set for one of the torque couplings.
Figure 16B:
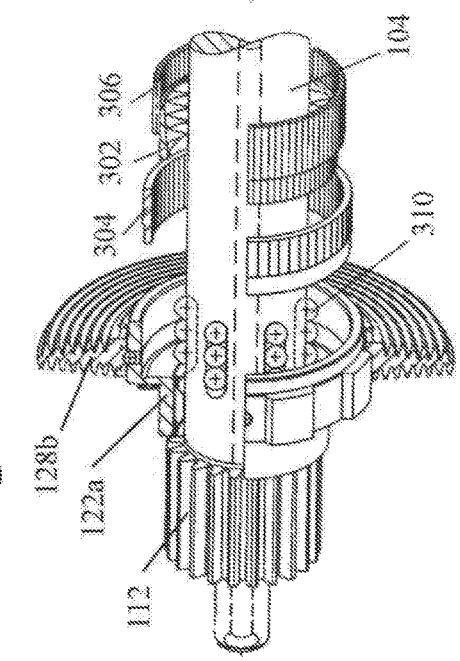
FIG. 16b is a three-quarter cross-sectional view of an alternate cone coupling.

In contrast to the transmission drive-line stage 100, the transmission drive-line stage 200 does not provide a neutral/vehicle launch capability due to the synchronisation between the torque couplings 210a, 210b. FIGS. 16a, 16b and 16c depict three variations of the torque input member which can provide the transmission drive-line stage 200 with a neutral/vehicle launch capability. The variations depicted in FIGS. 16a and 16b selectively couple the sun gear to the input shaft 104 via a cone coupling, whereas the variation depicted in FIG. 16c selectively couples the sun gear to the input shaft 104 via a synchromesh gear set.

The torque input member depicted in FIG. 16a comprises the input shaft 104, a sun gear 112b, a conical actuator 300, and a full-complement multi-directional cone coupling, as previously described by the instant inventor in U.S. Pat. No. 6,409,001. The sun gear 112b is substantially identical to the sun gear 112 previously described, except that it is not integral with the input shaft 104. Instead, the sun gear 112b is selectively coupled to the input shaft by the cone coupling, as will be described below.

The input shaft 104 includes a plurality of elongate slots. The conical actuator 300 includes an inner slotted surface, and an outer conical friction surface. The inner slotted surface and the elongate slots together define a plurality of channels for receiving ball bearings 310 therein. The conical actuator 300 is axially movable along the input shaft 104 via the ball bearings 310. However, the ball bearings 310 prevent the conical actuator 300 from rotating relative to the input shaft 104.

The cone coupling is disposed within the stepped attachment bracket 122, and comprises an inner coupling member 302, an outer coupling member 304, a tubular slipper 306, and a plurality of roller bearings. The inner coupling member 302 has a inner conical friction surface, and an outer cylindrical friction surface. The inner conical friction surface is configured for engagement with the outer conical friction surface of the conical actuator 300.

The slipper 306 has an inner friction surface and an outer bearing surface. The outer coupling member 304 has an inner bearing surface and an outer friction surface. The outer friction surface of the outer coupling member 304 is frictionally coupled to the stepped attachment bracket 122. The inner and outer bearing surfaces together define a plurality of channels for receiving the roller bearings therein. The channels and roller bearings are configured to couple the inner and outer coupling members 302, 304 together as the slipper 306 and outer coupling member 304 rotate relative to each other.

When the conical actuator 300 is withdrawn from the cone coupling, the input shaft 104 is free to rotate relative to the stepped attachment bracket 122 and the sun gear 112a, thereby providing the transmission drive-line stage 200 with a neutral gear. However, as the conical actuator 300 is urged towards the stepped attachment bracket 122 via a suitable actuator 312, the outer conical friction surface of the conical actuator 308 frictionally engages the inner conical friction surface of the inner coupling member 302. As a result, the conical actuator 300 progressively couples the input shaft 104 to the stepped attachment bracket 122 and the sun gear 112a via the cone coupling, thereby transferring input torque from the input shaft 104 to the stepped attachment bracket 122 and the sun gear 112a.

With the input member depicted in FIG. 16a, the sun gear 112a, planetary gears 114 and annular gear 106 are not subject to input rotation until after cone closure. Therefore, vehicle launch in either ratio-state $X^1$ or $X^0$ is not possible without cone closure, effectively making the cone coupling rather than the torque couplings 210a, 210b the launching mechanism.

The torque input member depicted in FIG. 16b is substantially identical to the torque input member depicted in FIG. 16a except that once again the sun gear 112 is integral with the input shaft 104. However, the stepped attachment bracket 122a is not spline-attached to the sun gear 112, but is instead selectively coupled to the input shaft 104 via the cone coupling. With the input member depicted in FIG. 16b, input rotation of the sun gear 112a is not subject to cone closure. Since vehicle launch in ratio-state $X^1$ is possible without cone closure (upon activation of the outermost torque coupling 210a); cone closure is only required to effect ratio-state $X^0$.

The torque input member depicted in FIG. 16c is substantially identical to the torque input member depicted in FIG. 16b except that the stepped attachment bracket 122a is selectively coupled to the input shaft 104 via a synchromesh gear set 314. As above, the ball bearings 310 allow the synchromesh gear set 314 to move axially along the input shaft, but also prevent the synchromesh gear set 314 from rotating relative to the input shaft 104.

With the input member depicted in FIG. 16c, input rotation of the sun gear 112a is not subject to synchromesh gear set engagement. Therefore, vehicle launch in ratio-state $X^1$ is possible without synchromesh gear set engagement, and is only required to effect ratio-state $X^0$.

Relative Performance of Transmission Drive-Line Stages

The inventor has determined that replacing the conventional multi-disc/plate clutch pack of a conventional transmission drive-line stage with the torque couplings 110 of the transmission drive-line stage 100 decreases parasitic/no load open clutch losses to between 66% to 75%. Further, the transmission drive-line stage 100 does not require an external co-ordinating mechanism to effect an acceptable transition between ratio-state $X^0$ and ratio-state $X^1$ while the vehicle is motion.

The inventor has determined that replacing the torque couplings 110 of the transmission drive-line stage 100 with the torque couplings 210 of the transmission drive-line stage 200 (but without the optional configurations depicted in FIG. 9, 10a, 10b, 11a, 11b, 12, 13 or 14) realizes an additional parasitic/no load loss savings of between 700 and 1600 watts depending on a speed of rotation. Further, the transmission drive-line stage 200 does not require dynamic high pressure oil seals.

Modifying the transmission drive-line stage 100, 200 by replacing the planetary gear set 104 with a coplanar reverted gear set, as previously described by the instant inventor in U.S. Pat. No. 6,126,566, further decreases parasitic/no load losses. Use of the configuration depicted in FIGS. 9, 10a, 12, 13 and 14 decreases parasite/no load losses even further.

Figure 17A:
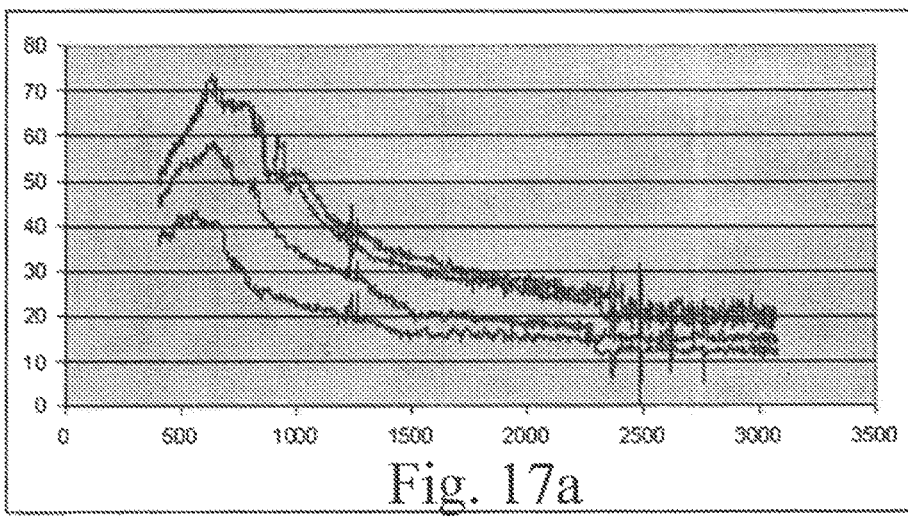
FIG. 17a depicts open-coupling parasitic/no-load drag test results for multi-disc/plate coupling.
Figure 17B:
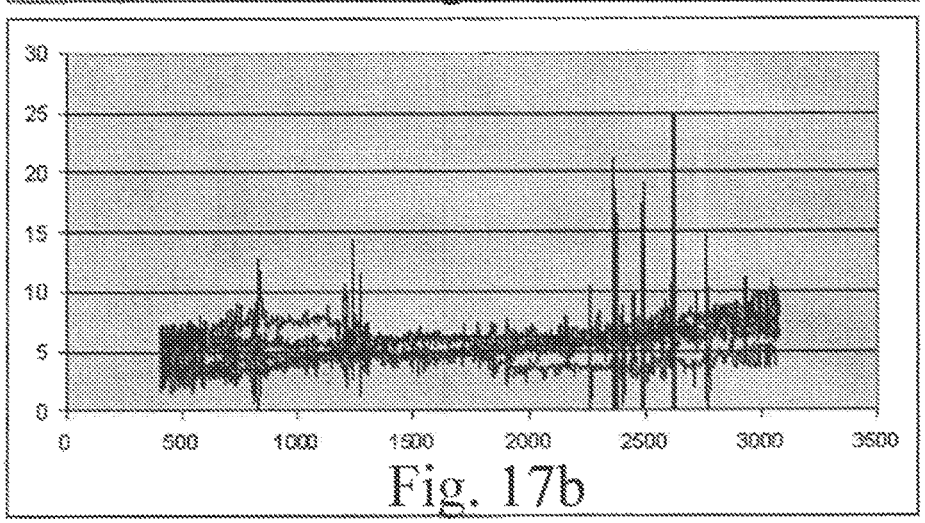
FIG. 17b depicts open-coupling parasitic/no-load drag test results for one of the torque coupling.

The inventor conducted parasitic/no-load drag tests of the torque coupling 210b in which the sun gear of the transmission drive-line stage was disabled, and the annular gear was coupled directly to the output cage of the planetary gear set. FIG. 17b depicts the open-coupling parasitic/no-load drag test results for a transmission drive-line stage having the torque coupling 210b and the spring centering mechanism of FIG. 12. For comparison purposes, FIG. 17a depicts open-coupling parasitic/no-load drag test results for a transmission drive-line stage having a multi-disc/plate coupling. In each figure, the abscissas represents drag torque (lb-in), and the ordinate represents rotational speed (rpm).

As shown, variance was very pronounced using the multi-disc/plate coupling, as show in FIG. 17a. In contrast, speed had little effect on the relatively steady drag torque of the torque couplings 210b, as shown in FIG. 17b. Moreover, these tests demonstrate that open drag favours torque coupling 210b over a multi-disc/plate coupling of equivalent capacity, by lowering drag losses by 66% and 75% when rotation speed is between 500 and 2000 rpm, with a lesser improvement in performance at higher speeds.

Figure 17C:
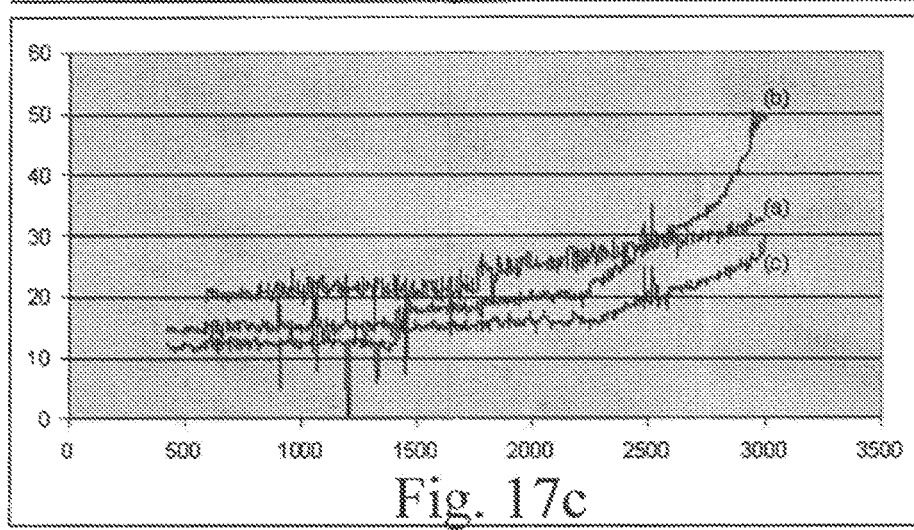
FIG. 17c compares oil squish and no-load drag test results for different gear sets.

FIG. 17c compares the oil squish and no-load drag test results for a transmission drive-line stage having a planetary gear set against a transmission drive-line stage having a coplanar reverted gear set. Graph a) depicts the oil squish parasitic/no-load drag test results for a transmission drive-line stage having a planetary gear set but with the clutch pack removed. Graph b) depicts the oil squish parasitic/no-load drag test results for a transmission drive-line stage having a coplanar reverted gear set but with the clutch pack removed. Graph c) depicts the parasitic drag for the oil seals of the transmission drive-line stages of FIG. 17a, 17b, but with the couplings closed. Again, the abscissas represents drag torque (lb-in), and the ordinate represents rotational speed (rpm).

These test results suggest that use of the transmission drive-line stage 100, 200, but configured with a series of coplanar reverted gear sets (instead of planetary gear sets) to effect an eight or sixteen-speed transmission drive-line, would reduce parasitic/no load losses by 12,000-15,000 watts, or the equivalent of 15-20 hp, when equated to an engine speed of 2000 rpm, and would provide a road efficiency of over 90% when equated to the power needed for highway driving.

I claim:

1. A coupling comprising:
at least two inter-connected torque couplings, each comprising:
a pair of clutch end members, each said end member including a set of concentric V-grooves disposed on a respective face thereof;
a clutch centre member disposed between the respective clutch end members, the centre member being axially movable between the respective end members and including a pair of opposing surfaces, one of the opposing surfaces including a plurality of concentric V-grooves configured to mesh with the set of V-grooves of one of the respective end members, another of the opposing surfaces including a plurality of concentric V-grooves configured to mesh with the set of V-grooves of another of the respective end members; and
an actuator coupled to one of the end members and being configured to simultaneously couple the end members to the centre member by engaging the V-grooves of both of the respective end members with the V-grooves of the centre member,
wherein the centre member of one of the torque couplings comprises one of the opposing surfaces of the one torque coupling, another of the opposing surfaces of the one torque coupling and one of the end members of another of the torque couplings, and
wherein the centre member of the another torque coupling has a radially outer end and a radially inner end, each said V-groove includes a root disposed between peaks, and the opposing surfaces are disposed at an acute angle relative to each other such that a distance between one of the peaks of the one opposing surface and a closest one of the peaks of the another opposing surface is less at one of the radial ends than at another of the radial ends.

2. The coupling according to claim 1, wherein the roots of the one clutch plate are radially offset from the roots of the another clutch plate.

3. The coupling according to claim 1, wherein each said V-groove provided on the centre member of at least one of the torque couplings comprises a root disposed between adjacent peaks, and the centre member of the at least one torque coupling has a radially outer end and a radially inner end and comprises at least one oil passage extending radially through a plurality of the roots thereof towards the inner end thereof.

4. The coupling according to claim 3, wherein the centre member of the at least one torque coupling comprises a plurality of the oil passages each extending through a respective number of the roots thereof in accordance with an angular position of the oil passage.

5. A coupling comprising:
 at least two inter-connected torque couplings, each comprising:
  a pair of clutch end members, each said end member including a set of concentric V-grooves disposed on a respective face thereof;
  a clutch centre member disposed between the respective clutch end members, the centre member being axially movable between the respective end members and including a pair of opposing surfaces, one of the opposing surfaces including a plurality of concentric V-grooves configured to mesh with the set of V-grooves of one of the respective end members, another of the opposing surfaces including a plurality of concentric V-grooves configured to mesh with the set of V-grooves of another of the respective end members; and
  an actuator coupled to one of the end members and being configured to simultaneously couple the end members to the centre member by engaging the V-grooves of both of the respective end members with the V-grooves of the centre member,
 wherein the centre member of one of the torque couplings comprises one of the opposing surfaces of the one torque coupling, another of the opposing surfaces of the one torque coupling and one of the end members of another of the torque couplings,
 wherein the another torque coupling comprises a centering mechanism coupled to the centre member thereof and configured to urge the center member thereof away from the respective end members, and
 wherein the centering mechanism comprises one of a ball and a spring coupled to a rotational shaft, the centre member of the another torque coupling has a radially outer end and a radially inner end, and the radially inner end of the centre member of the another torque coupling is configured for mounting to the rotational shaft and comprises a recess configured for capturing the centering mechanism therein.

6. The coupling according to claim 5, wherein the recess comprises a V-shaped pocket.

7. A coupling comprising:
 at least two inter-connected torque couplings, each comprising:
  a pair of clutch end members, each said end member including a set of concentric V-grooves disposed on a respective face thereof;
  a clutch centre member disposed between the respective clutch end members, the centre member being axially movable between the respective end members and including a pair of opposing surfaces, one of the opposing surfaces including a plurality of concentric V-grooves configured to mesh with the set of V-grooves of one of the respective end members, another of the opposing surfaces including a plurality of concentric V-grooves configured to mesh with the set of V-grooves of another of the respective end members; and
  an actuator coupled to one of the end members and being configured to simultaneously couple the end members to the centre member by engaging the V-grooves of both of the respective end members with the V-grooves of the centre member,
 wherein the centre member of one of the torque couplings comprises one of the opposing surfaces of the one torque coupling, another of the opposing surfaces of the one torque coupling and one of the end members of another of the torque couplings, and
 wherein the centre member of at least one of the torque couplings comprises at least one oil passage configured to facilitate a cascading oil flow to the V-grooves of the respective end members.

8. A coupling comprising:
 at least two inter-connected torque couplings, each comprising:
  a pair of clutch end members, each said end member including a set of concentric V-grooves disposed on a respective face thereof;
  a clutch centre member disposed between the respective clutch end members, the centre member being axially movable between the respective end members and including a pair of opposing surfaces, one of the opposing surfaces including a plurality of concentric V-grooves configured to mesh with the set of V-grooves of one of the respective end members, another of the opposing surfaces including a plurality of concentric V-grooves configured to mesh with the set of V-grooves of another of the respective end members; and
  an actuator coupled to one of the end members and being configured to simultaneously couple the end members to the centre member by engaging the V-grooves of both of the respective end members with the V-grooves of the centre member,
 wherein the centre member of one of the torque couplings comprises one of the opposing surfaces of the one torque coupling, another of the opposing surfaces of the one torque coupling and one of the end members of another of the torque couplings, and
 wherein one of the end members of at least one of the torque couplings comprises at least one oil passage configured to provide a flow of oil to the associated V-grooves of the centre member thereof.

9. A coupling comprising:
 at least two inter-connected torque couplings, each comprising:
  a pair of clutch end members, each said end member including a set of concentric V-grooves disposed on a respective face thereof;
  a clutch centre member disposed between the respective clutch end members, the centre member being axially movable between the respective end members and including a pair of opposing surfaces, one of the opposing surfaces including a plurality of concentric V-grooves configured to mesh with the set of V-grooves of one of the respective end members, another of the opposing surfaces including a plurality of concentric V-grooves configured to mesh with the set of V-grooves of another of the respective end members; and
  an actuator coupled to one of the end members and being configured to simultaneously couple the end members to the centre member by engaging the V-grooves of both of the respective end members with the V-grooves of the centre member, wherein the centre member of one of the torque couplings comprises one of the opposing surfaces of the one torque coupling, another of the opposing surfaces of the one torque coupling and one of the end members of another of the torque couplings, and wherein each said V-groove provided on at least one of the end members of at least one of the torque couplings comprises a root disposed between adjacent peaks, and the at least one end member of the at least one torque coupling has a radially outer end and a radially inner end and comprises at least one oil passage, each said oil passage comprising a through-hole extending axially from one of the roots thereof towards an opposite face of the at least one end member, and a slot provided in the opposite face thereof and extending radially from the through-hole towards the inner end thereof.

10. The coupling according to claim 9, wherein the one end member comprises a plurality of the oil passages disposed at varying radial positions around the one end member.

11. A transmission drive-line stage comprising:
a torque input member;
a torque reactive member;
a torque output member; and
a pair of torque couplings configured to transfer torque between the torque input member and the torque output member, each said torque coupling comprising:
a pair of clutch end members, each said end member including a set of concentric V-grooves disposed on a respective face thereof;
a clutch centre member disposed between the respective clutch end members, the centre member being axially movable between the respective end members and including a pair of opposing surfaces, one of the opposing surfaces including a plurality of concentric V-grooves configured to mesh with the set of V-grooves of one of the respective end members, another of the opposing surfaces including a plurality of concentric V-grooves configured to mesh with the set of V-grooves of another of the respective end members; and
an actuator coupled to one of the end members and being configured to simultaneously couple the end members to the centre member by engaging the V-grooves of both of the respective end members with the V-grooves of the centre member, wherein the centre member of one of the torque couplings is coupled to the torque reactive member, one of the end members of another of the torque couplings is coupled to the torque reactive member, and the centre member of the another torque coupling is coupled to the torque input member, and wherein the centre member of the one torque coupling comprises one of the opposing surfaces of the one torque coupling, another of the opposing surfaces of the one torque coupling and one of the end members of the another torque coupling.

12. The transmission drive-line stage according to claim 11, wherein the actuator of the one torque coupling is operable independently of the actuator of the another torque coupling.

13. The transmission drive-line stage according to claim 11, wherein the actuator of the another torque coupling is configured to uncouple the end members thereof from the centre member thereof in synchronism with activation of the actuator of the one torque coupling, such that an increase in torque between the end members and the centre member in the one torque coupling is accompanied by a corresponding decrease in torque between the end members and the centre member in the another torque coupling.

14. The transmission drive-line stage according to claim 11, wherein the centre member of the another torque coupling has a radially outer end and a radially inner end, each said V-groove includes a root disposed between peaks, and the opposing surfaces are disposed at an acute angle relative to each other such that a distance between one of the peaks of the one opposing surface and a closest one of the peaks of the another opposing surface is less at one of the radial ends than at another of the radial ends.

15. The transmission drive-line stage according to claim 14, wherein the roots of the one clutch plate are radially offset from the roots of the another clutch plate.

16. The transmission drive-line stage according to claim 11, wherein the another torque coupling comprises a centering mechanism coupled to the centre member thereof and configured to urge the center member thereof away from the respective end members.

17. The transmission drive-line stage according to claim 16, wherein the centering mechanism comprises one of a ball and a spring coupled to the torque input member, the centre member of the another torque coupling has a radially outer end and a radially inner end, and the radially inner end of the centre member of the another torque coupling comprises a recess configured for capturing the centering mechanism therein.

18. The transmission drive-line stage according to claim 11, wherein the centre member of the another torque coupling is selectively coupled to the torque input member via one of a cone coupling and a synchromesh gear set.

19. The transmission drive-line stage according to claim 11, wherein the torque input member comprises a torque input shaft and a sun gear provided on the torque input shaft, the torque reactive member comprises an annular gear, and the torque output member comprises a coplanar reverted gear loop coupled to the annular gear and the sun gear.

20. The transmission drive-line stage according to claim 11, wherein the torque reactive member comprises at least one axially-extending finger, and the clutch plates are mounted on the at least one finger and rotate with the torque reactive member, the one clutch plate being axially movable along the at least one finger, the another clutch plate being fixed to the at least one finger.

21. The transmission drive-line stage according to claim 20, wherein the end plates of the another torque coupling rotate with the torque reactive member and are axially movable along the at least one finger.

22. The transmission drive-line stage according to claim 11, wherein the centre member of the one torque coupling comprises a pair of clutch plates, one of the clutch plates comprises the one opposing surface of the one torque coupling, and another of the clutch plates comprises the another of the opposing surfaces of the one torque coupling and the one end member of the another torque coupling.

23. The transmission drive-line stage according to claim 22, wherein the one clutch plate is axially movable with respect to the another clutch plate, and the actuator of the another torque coupling comprises a biasing spring urging the end members thereof and the centre member thereof together and urging the clutch plates apart, the biasing spring and the actuator of the one torque coupling being configured to limit drive-line torque discontinuity during transition between the gear ratios.

24. The transmission drive-line stage according to claim 23, wherein the biasing spring is disposed between the clutch plates, the another of the opposing surfaces of the one torque coupling and the one end member of the another torque coupling are disposed on a common side of the another clutch plate, and the another of the opposing surfaces of the one torque coupling is disposed radially outwards from the one end member of the another torque coupling.

25. A coupling comprising:
   at least two inter-connected torque couplings, each comprising:
      a pair of clutch end members, each said end member including a set of concentric V-grooves disposed on a respective face thereof;
      a clutch centre member disposed between the respective clutch end members, the centre member being axially movable between the respective end members and including a pair of opposing surfaces, one of the opposing surfaces including a plurality of concentric V-grooves configured to mesh with the set of V-grooves of one of the respective end members, another of the opposing surfaces including a plurality of concentric V-grooves configured to mesh with the set of V-grooves of another of the respective end members; and
      an actuator coupled to one of the end members and being configured to simultaneously couple the end members to the centre member by engaging the V-grooves of both of the respective end members with the V-grooves of the centre member,
   wherein the centre member of one of the torque couplings comprises one of the opposing surfaces of the one torque coupling, another of the opposing surfaces of the one torque coupling and one of the end members of another of the torque couplings, and
   wherein the actuator of the one torque coupling is operable independently of the actuator of the another torque coupling.

26. A coupling comprising:
   at least two inter-connected torque couplings, each comprising:
      a pair of clutch end members, each said end member including a set of concentric V-grooves disposed on a respective face thereof;
      a clutch centre member disposed between the respective clutch end members, the centre member being axially movable between the respective end members and including a pair of opposing surfaces, one of the opposing surfaces including a plurality of concentric V-grooves configured to mesh with the set of V-grooves of one of the respective end members, another of the opposing surfaces including a plurality of concentric V-grooves configured to mesh with the set of V-grooves of another of the respective end members; and
      an actuator coupled to one of the end members and being configured to simultaneously couple the end members to the centre member by engaging the V-grooves of both of the respective end members with the V-grooves of the centre member,
   wherein the centre member of one of the torque couplings comprises one of the opposing surfaces of the one torque coupling, another of the opposing surfaces of the one torque coupling and one of the end members of another of the torque couplings, and
   wherein the actuator of the another torque coupling is configured to uncouple the end members thereof from the centre member thereof in synchronism with activation of the actuator of the one torque coupling.

27. A coupling comprising:
   at least two inter-connected torque couplings, each comprising:
      a pair of clutch end members, each said end member including a set of concentric V-grooves disposed on a respective face thereof;
      a clutch centre member disposed between the respective clutch end members, the centre member being axially movable between the respective end members and including a pair of opposing surfaces, one of the opposing surfaces including a plurality of concentric V-grooves configured to mesh with the set of V-grooves of one of the respective end members, another of the opposing surfaces including a plurality of concentric V-grooves configured to mesh with the set of V-grooves of another of the respective end members; and
      an actuator coupled to one of the end members and being configured to simultaneously couple the end members to the centre member by engaging the V-grooves of both of the respective end members with the V-grooves of the centre member,
   wherein the centre member of one of the torque couplings comprises one of the opposing surfaces of the one torque coupling, another of the opposing surfaces of the one torque coupling and one of the end members of another of the torque couplings, and
   wherein the centre member of the one torque coupling comprises a pair of clutch plates, one of the clutch plates comprises the one opposing surface of the one torque coupling, and another of the clutch plates comprises the another of the opposing surfaces of the one torque coupling and the one end member of the another torque coupling.

28. The coupling according to claim 27, wherein the one clutch plate is axially movable with respect to the another clutch plate, and the actuator of the another torque coupling comprises a biasing spring urging the end members thereof and the centre member thereof together and urging the clutch plates apart.

29. The coupling according to claim 28, wherein the biasing spring is disposed between the clutch plates, the another of the opposing surfaces of the one torque coupling and the one end member of the another torque coupling are disposed on a common side of the another clutch plate, and the another of the opposing surfaces of the one torque coupling is disposed radially outwards from the one end member of the another torque coupling.

* * * * *